US012346844B2

(12) United States Patent
Parameswaran et al.

(10) Patent No.: US 12,346,844 B2
(45) Date of Patent: Jul. 1, 2025

(54) USING RANDOMNESS COMPENSATING FACTORS TO IMPROVE FORECAST ACCURACY

(71) Applicant: United Parcel Service of America, Inc., Atlanta, GA (US)

(72) Inventors: Sathiyan Parameswaran, Atlanta, GA (US); Padmanabha Shastry Varadarajula, Atlanta, GA (US); Pavan Doddipalli, Atlanta, GA (US); Dhruvil Parikh, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 752 days.

(21) Appl. No.: 16/925,744

(22) Filed: Jul. 10, 2020

(65) Prior Publication Data
US 2022/0012651 A1 Jan. 13, 2022

(51) Int. Cl.
*G06Q 10/04* (2023.01)
*G06N 7/01* (2023.01)
*G06Q 10/083* (2024.01)

(52) U.S. Cl.
CPC .............. *G06Q 10/04* (2013.01); *G06N 7/01* (2023.01); *G06Q 10/083* (2013.01)

(58) Field of Classification Search
CPC ....... G06Q 10/04; G06Q 10/083; G06N 7/005
USPC ........................................................ 705/7.29
See application file for complete search history.

(56) References Cited

U.S. PATENT DOCUMENTS

| 2015/0242364 A1* | 8/2015 | Moore ................ G06F 17/14 |
| | | 708/400 |
| 2019/0120995 A1* | 4/2019 | Lin ..................... G01V 3/38 |
| 2019/0156283 A1 | 5/2019 | Abebe et al. |
| 2019/0310651 A1* | 10/2019 | Vallespi-Gonzalez ...... |
| | | G01S 17/58 |
| 2020/0104392 A1* | 4/2020 | Hong ................ G06F 11/3409 |

(Continued)

OTHER PUBLICATIONS

"Boosting Vehicle-to-cloud Communication by Machine Learning-enabled Context Prediction" to Sliwa et al, Jul. 19, 2019 (Year: 2019).*

(Continued)

*Primary Examiner* — Charles Guiliano
*Assistant Examiner* — Po Han Lee
(74) *Attorney, Agent, or Firm* — Shook, Hardy & Bacon L.L.P.; Joseph W. Cruz

(57) ABSTRACT

Input data that includes one or more observations made at one or more corresponding time slices is received. The input data is provided to one or more time-based prediction models that predict one or more values for one or more future time slices. One or more randomness compensating factors are determined. The one or more randomness compensating factors correspond to one or more features indicative of one or more events associated with the one or more corresponding time slices. Based at least in part on the determining of the one or more randomness compensating factors and the prediction of the one or more time-based prediction models, a second one or more values for at least one of the one or more future time slices are predicted. In response to the predicting of the second one or more values, an indication associated with the predicted second one or more values are presented to a user computer device.

12 Claims, 11 Drawing Sheets

(56) References Cited

U.S. PATENT DOCUMENTS

2021/0168019 A1\* 6/2021 Qingsong ............. H04L 41/064
2021/0272141 A1\* 9/2021 Ding .................. G06Q 30/0202

OTHER PUBLICATIONS

Office action received for Canadian Patent Application No. 3120287, mailed on Jun. 28, 2024, 7 pages.

\* cited by examiner

| LOGISTICS FACILITY | DAY | VOLUME | FORECAST | ERROR | ERROR 2 | WMAPE |
|---|---|---|---|---|---|---|
| Y | 1 | 32 | 32 | - | - | - |
| Y | 2 | 43 | 32 | 11 | 121 | 25.6 |
| Y | 3 | 56 | 34.2 | 21.8 | 475.24 | 38.9 |
| Y | 4 | 54 | 38.56 | 15.44 | 238.39 | 28.6 |
| Y | 5 |  | 41.65 |  |  |  |

| RANDOMNESS COMPENSATING FACTOR | LOGISTICS FACILITY | DAY | VOLUME | ADJUSTED FORECAST | ERROR | ERROR 2 | WMAPE |
|---|---|---|---|---|---|---|---|
| - | Y | 1 | 32 | 32 | - | - | - |
| - | Y | 2 | 43 | 32 | - | - | - |
| A | Y | 3 | 56 | 52 | - | - | - |
| A | Y | 4 | 54 | 50 | - | - | - |
| - | Y | 5 | | 41.65 | | | |

USING RANDOMNESS COMPENSATING FACTORS TO IMPROVE FORECAST ACCURACY

BACKGROUND

Computer-implemented technologies can assist users by making predictions, and in particular, by making time-based predictions. For example, some computer applications are configured to use machine learning models or forecast models to make time sequence forecasts. Time series forecast models, for instance, correspond to algorithms that are used to predict future values at certain times based on previously observed values at certain times. Despite these advances, these models and computer applications suffer from a number of disadvantages, particularly in terms of their accuracy. This is due at least in part because the predictions of these applications fail to utilize hidden or latent factors that are important for making time-based predictions. To these applications and models, these latent factors are simply indicative of randomness, noise, or outliers, when in fact they are not.

SUMMARY

Various embodiments of the present disclosure are directed to a system, a computer-implemented method, and a computer readable storage medium. In some aspects, the system includes at least one computing device having at least one processor and at least one computer readable storage medium having program instructions embodied therewith. The program instructions are readable or executable by the at least one processor to cause the system to perform the following operations in some aspects. Input data that includes a plurality of observations made at corresponding time slices are received. The input data is provided to one or more base time-series forecasting models that predict one or more future values for one or more future time slices based on the one or more time-series forecasting models analyzing the input data. One or more randomness compensating factors are determined. The one or more randomness compensating factors correspond to one or more features indicative of one or more events that occur on one or more of the corresponding time slices. The one or more features are not indicated in the one or more base time-series forecasting models. For one or more of the corresponding time slices, one or more patterns of observations associated with the one or more randomness compensating factors are determined. Based at least in part on the one or more randomness compensating factors and the one or more patterns, the prediction of the one or more base time-series forecasting models is modified. In response to the modifying of the prediction, an indication associated with the modified prediction is presented to a user computer device.

In some aspects, the computer-implemented method includes the following operations. Input data that includes a plurality of observations made at corresponding time slices is received. The input data is provided to one or more time-based prediction models that predict one or more future values for one or more future time slices. One or more randomness compensating factors are determined. The one or more randomness compensating factors correspond to one or more features indicative of one or more events that occur on one or more of the corresponding time slices. For one or more of the corresponding time slices, one or more patterns of observations associated with the one or more randomness compensating factors are determined. Based at least in part on the one or more randomness compensating factors and the one or more patterns, the prediction of the one or more time-based prediction models is modified. In response to the modifying of the prediction, an indication associated with the modified prediction is presented to a user computer device.

In some aspects, the computer readable storage medium has program instructions embodied therewith. In some aspects, the program instructions are executable by one or more processors to cause the one or more processors to perform the following operations. Input data that includes one or more observations made at one or more corresponding time slices is received. The input data is provided to one or more time-based prediction models that predict one or more values for one or more future time slices. One or more randomness compensating factors are determined. The one or more randomness compensating factors correspond to one or more features indicative of one or more events associated with the one or more corresponding time slices. Based at least in part on the determining of the one or more randomness compensating factors and the prediction of the one or more time-based prediction models, a second one or more values for at least one of the one or more future time slices are predicted. In response to the predicting of the second one or more values, an indication associated with the predicted second one or more values are presented to a user computer device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. In various embodiments, any functionality can be added or removed from the computer-implemented method, the system, and the apparatus described above, such as functionality described with respect to the flow diagrams.

BRIEF DESCRIPTION OF THE DRAWINGS

Figure 1:
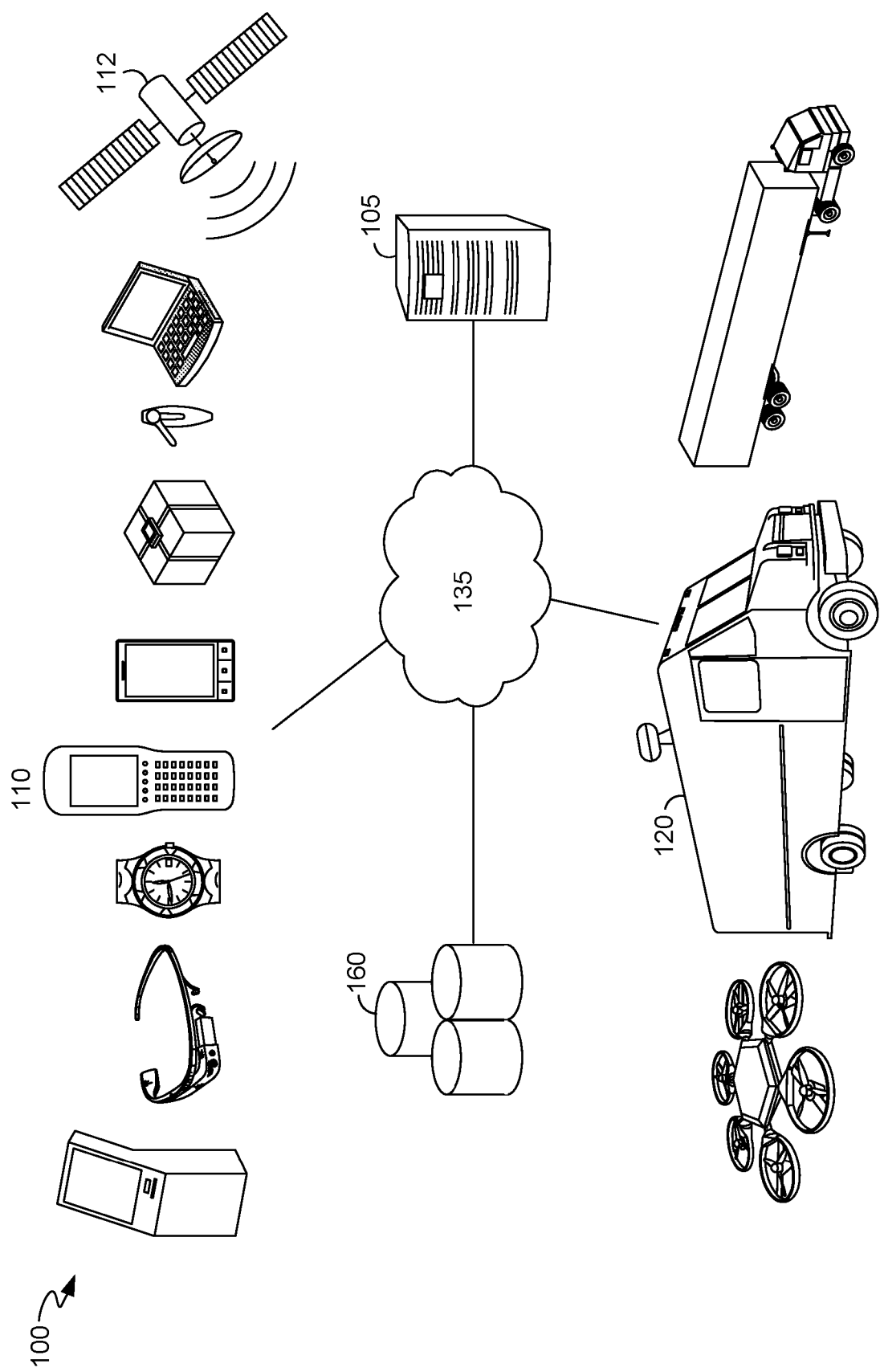

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
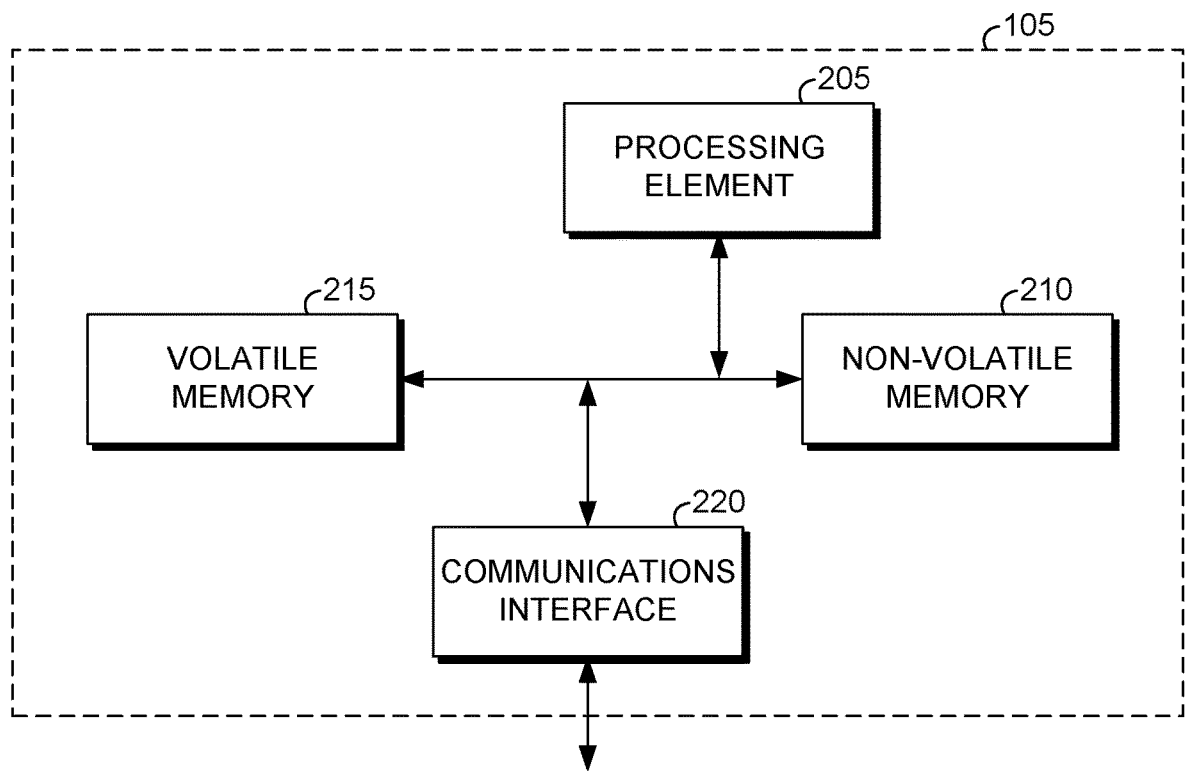

FIG. 2 is a schematic diagram of an analysis computing entity in which aspects of the present disclosure are employed in, according to some embodiments.

Figure 3:
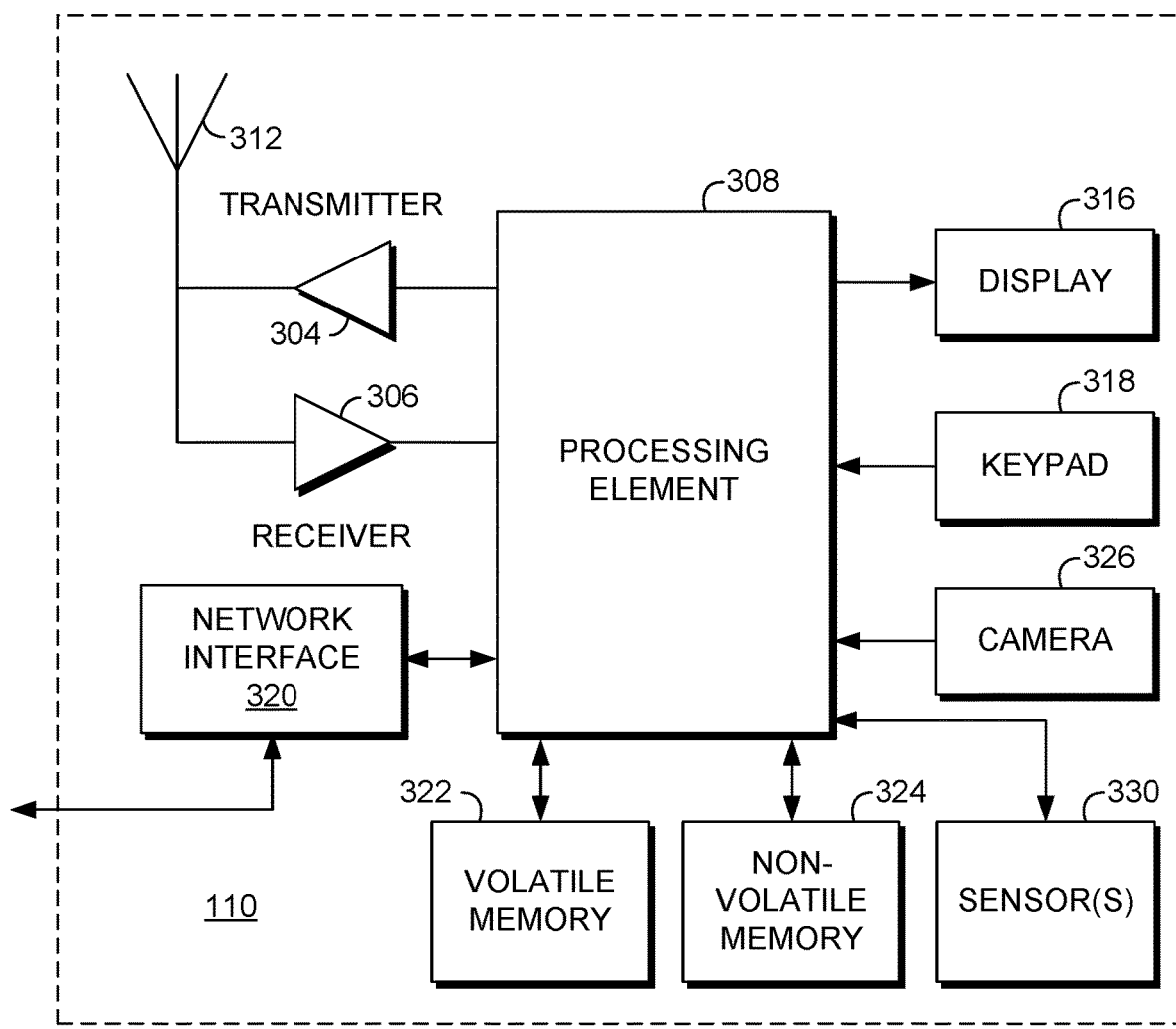

FIG. 3 is a schematic diagram of a computing entity in which aspects of the present disclosure are employed in, according to some embodiments.

Figure 4:
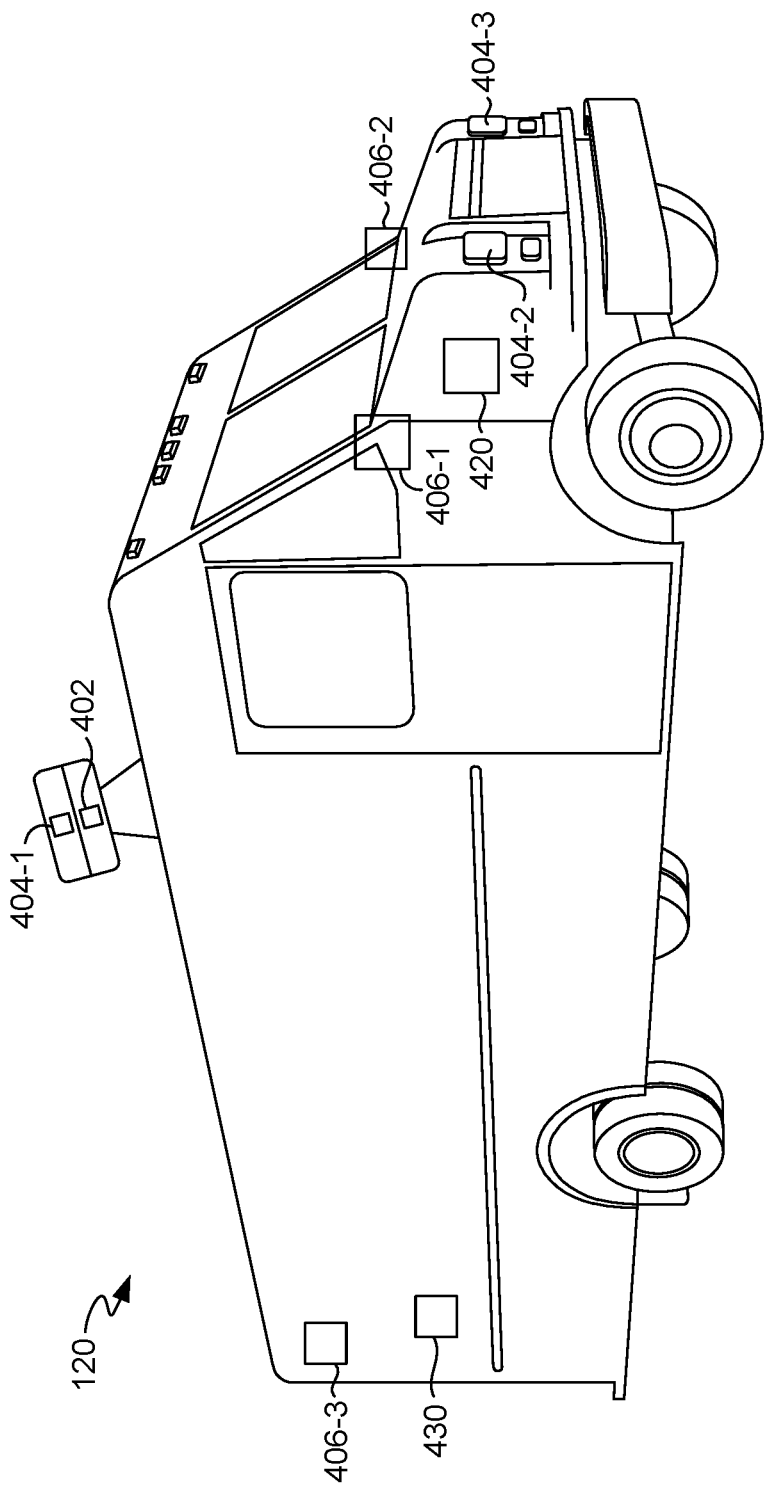

FIG. 4 is a block diagram of the logistics vehicle of FIG. 1, according to some embodiments.

Figure 5:
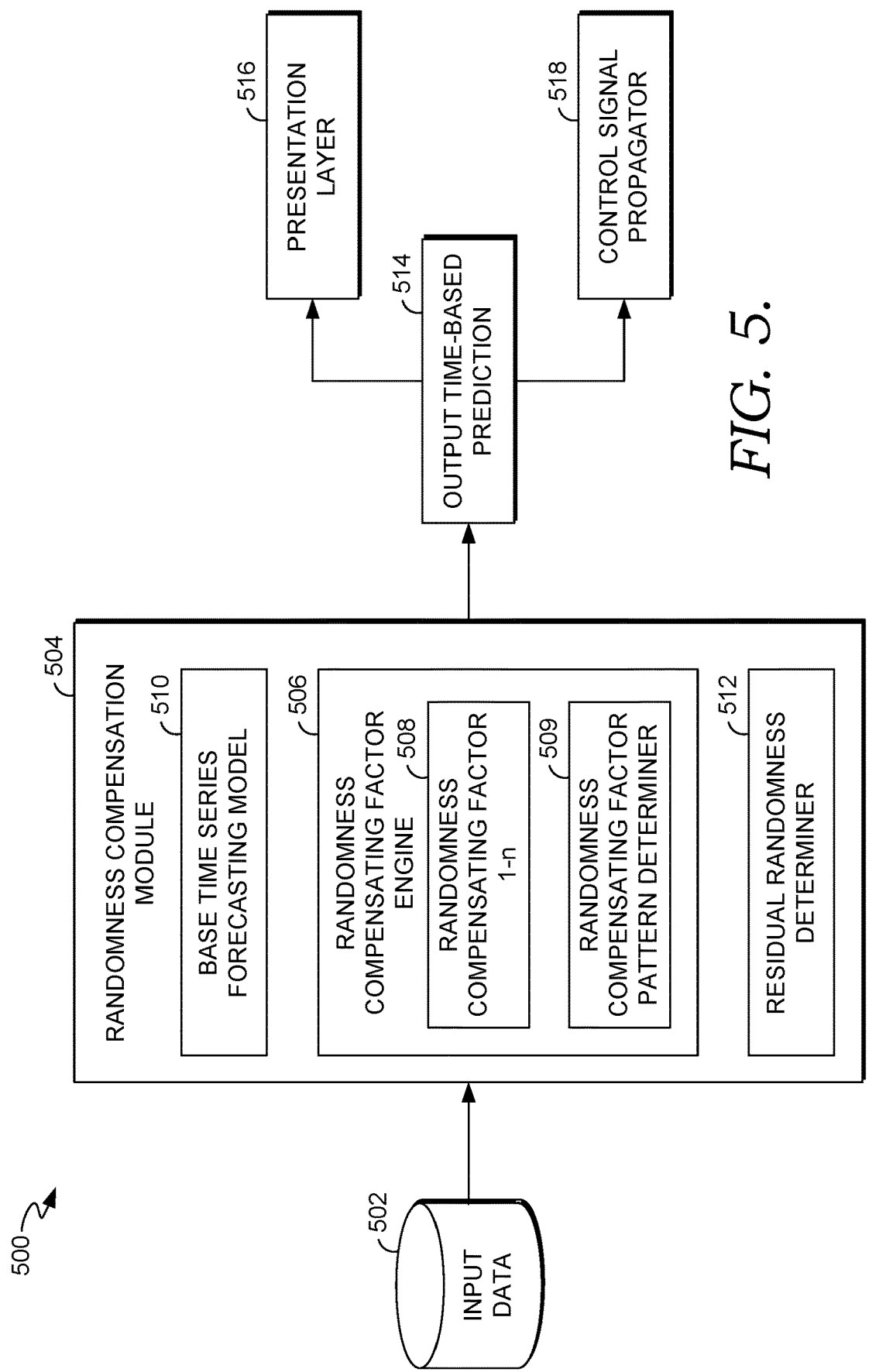

FIG. 5 is a block diagram of a system for making a time-based prediction, according to some embodiments.

Figure 6:
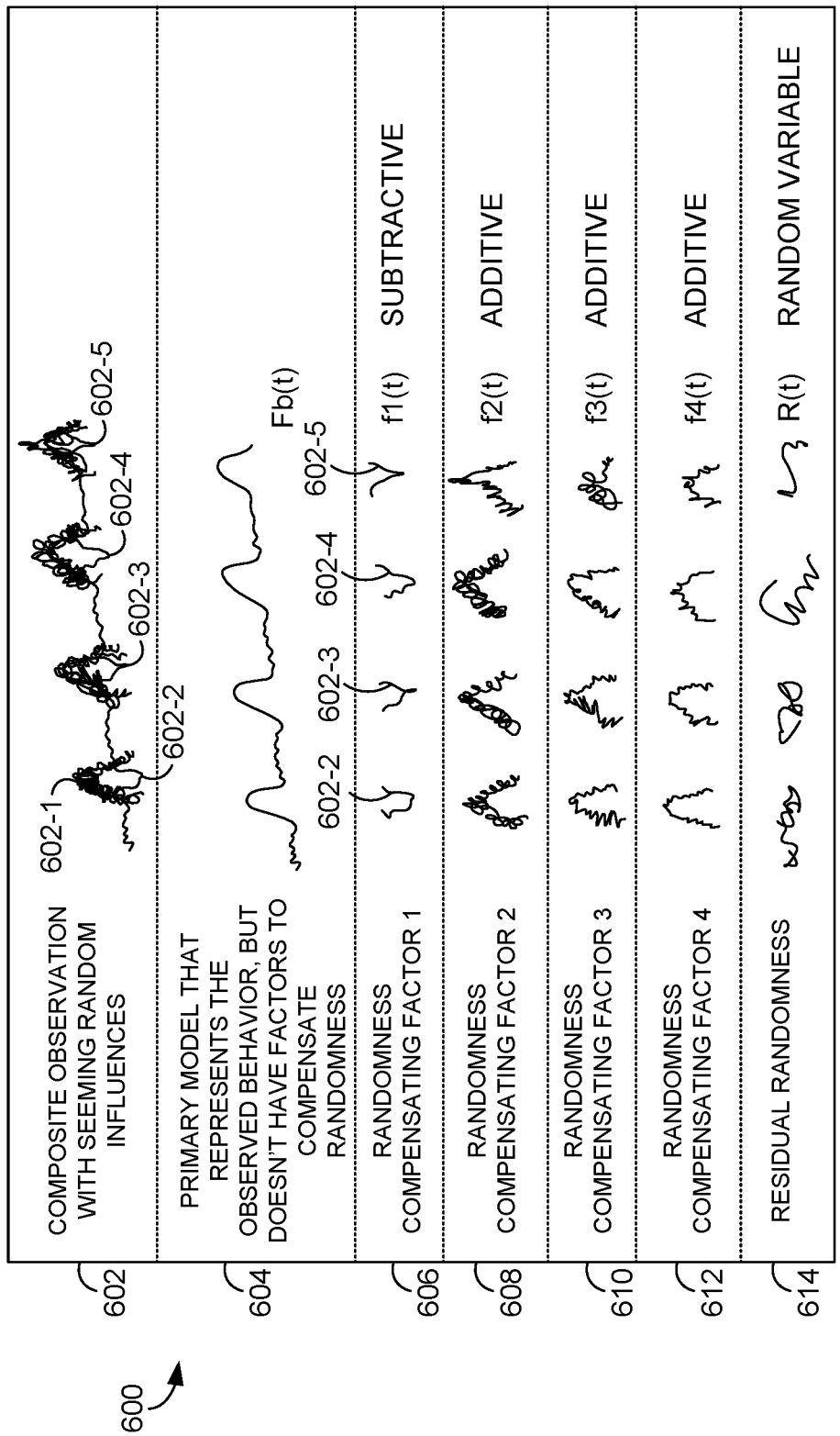

FIG. 6 is a schematic diagram illustrating how a composite observation can be broken down into a base model, randomness compensating factor patterns, and residual randomness, according to some embodiments.

Figure 7:
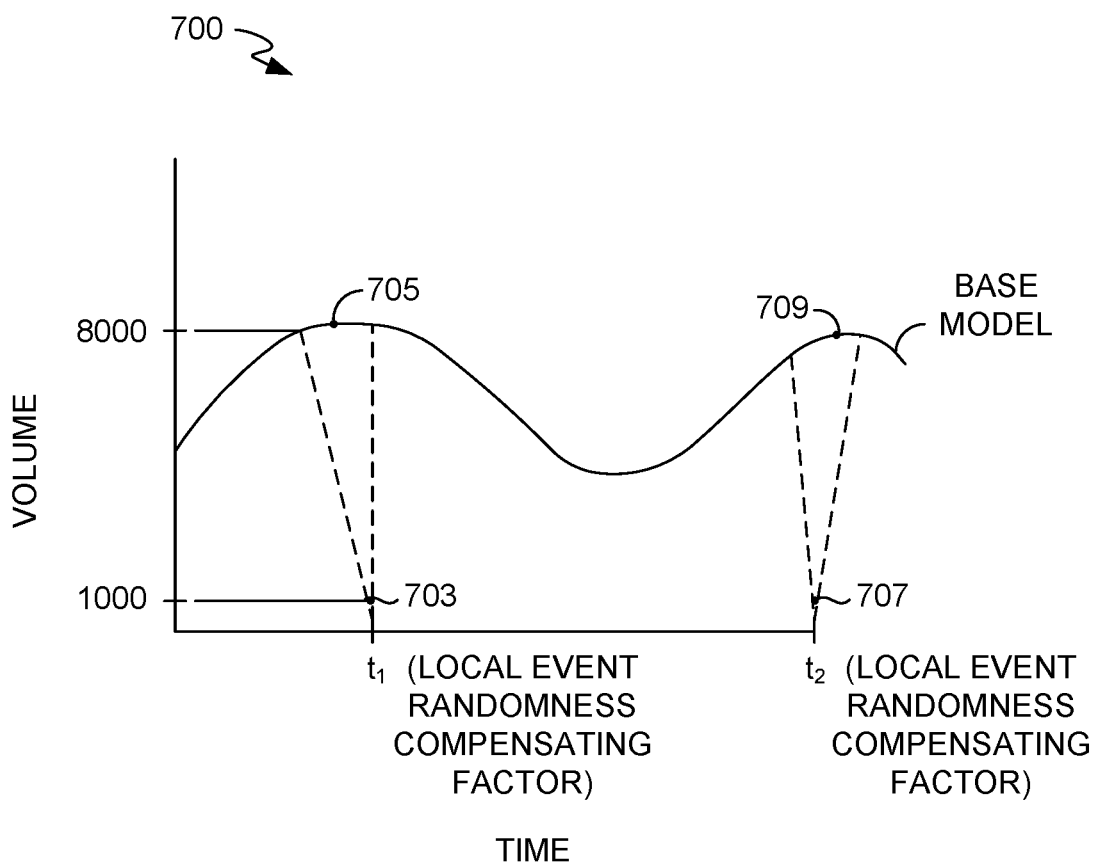

FIG. 7 is a time-series graph that specifically illustrates a base model volume observation relative to a volume observation associated with a particular randomness compensating factor for the same time slices, according to some embodiments.

Figures 8A, 8B:
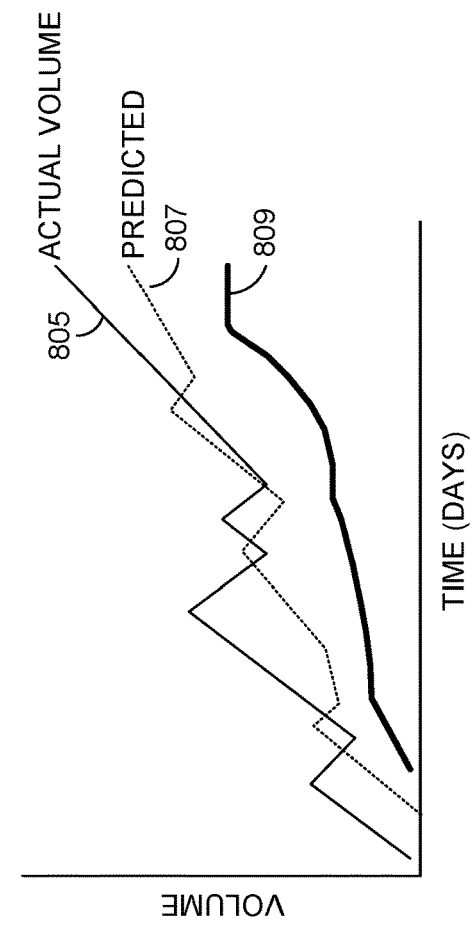

FIG. 8A is a schematic diagram of an example exponential smoothing forecast model table, according to some embodiments.

FIG. 8B is a schematic diagram of an example time series graph associated with the table of FIG. 8A, according to some embodiments.

Figures 8C, 8D:
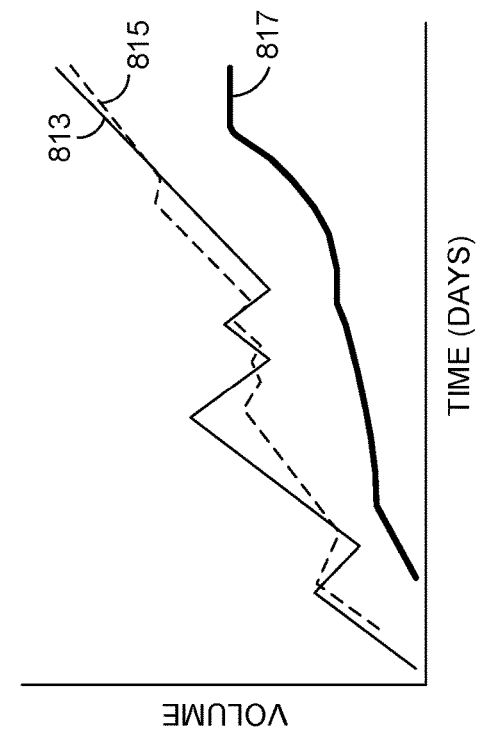

FIG. 8C is a schematic diagram of an example exponential smoothing forecast model table with adjusted values relative to FIG. 8A, according to some embodiments.

FIG. 8D is a schematic diagram of an example time series graph associated with the table of FIG. 8C, according to some embodiments.

Figure 9:

FIG. 9 is a schematic diagram of a mobile device indicating an alert that is presented based on making a prediction, according to some embodiments.

Figure 10:
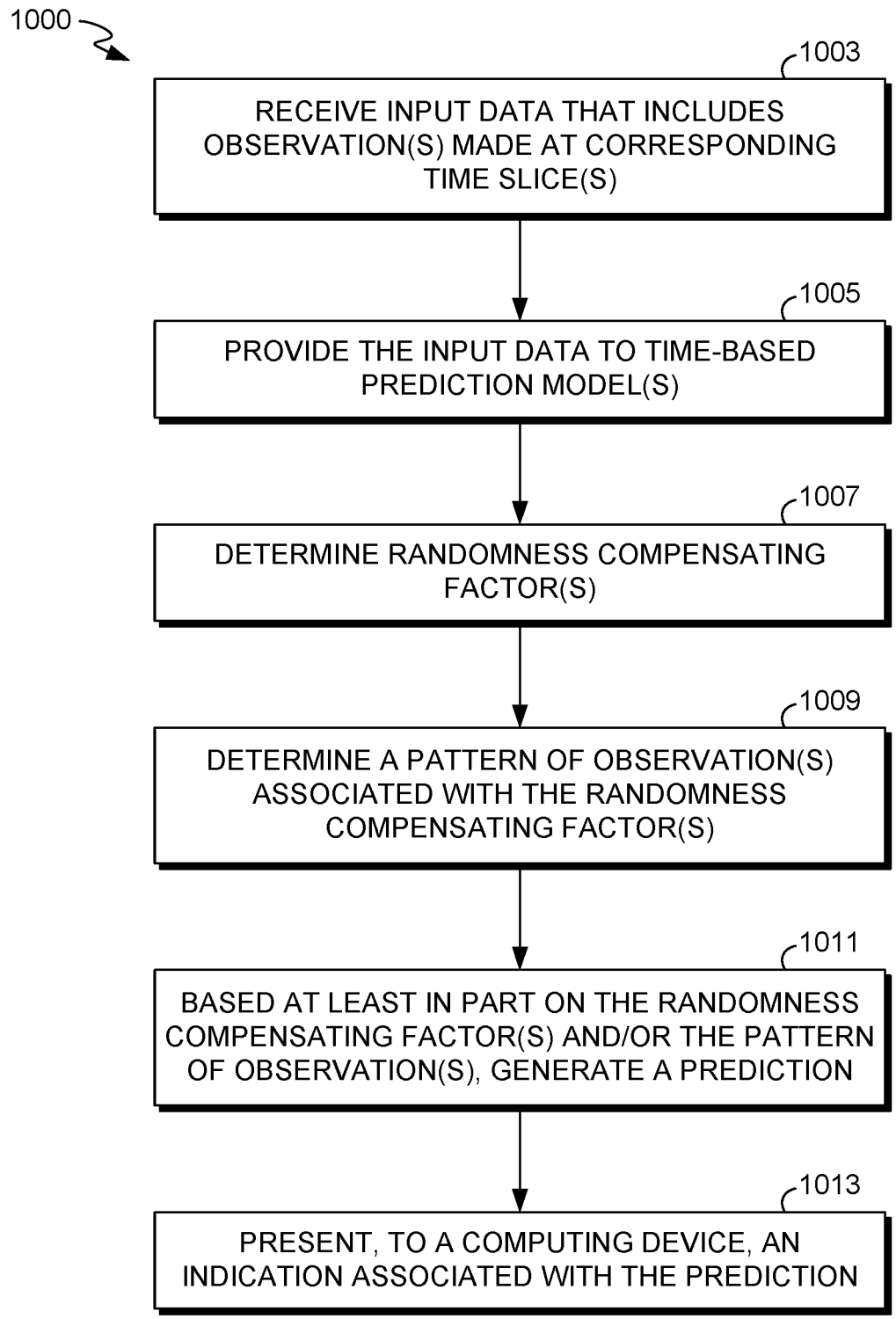

FIG. 10 is a flow diagram of an example process for generating a prediction, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

Some computer applications may use one or more models (e.g., exponential smoothing, hidden Markov models, etc.) to make time-based predictions. For example, previously observed values may indicate that at the end of a first year there were 3000 sales and at the end of a second year, there were 3050 sales. A very simple forecast model might, for example, predict the number of sales that will occur at the end of a third year by taking the average of these two values of the first and second year (3,025).

As described above, existing time-based prediction computer applications are often inaccurate. Various existing computer applications utilize several time series forecasting models with seasonality (e.g., periodic fluctuations at certain time intervals), expect the models to learn the context, and pick an output from one of the models that looks the most promising. These solutions hope to achieve high levels of accuracy without an intentional mechanism to improve the accuracy. However, this one-size-fits-all approach is very static and does not account for very specific latent factors that indicate various patterns of observations. For example, if an application were to predict pickup volume (the amount of parcels that will be processed) at a specific logistics facility (a domain), among many logistics stores, the precise prediction associated with the specific logistics store can be influenced by many latent factors, such as the location of the specific logistics store, the other businesses in the locale of the specific logistics store, local and national holidays, sale events at the logistics store only, huge business recalls, weather around the specific logistics store, geo-political events in the area that the specific logistics store is within, and the like. However, other domains or facilities may not be affected by the same factors to the same prediction magnitude as this specific logistics store, which is why these factors may be viewed as latent or hidden.

When all of these factors are combined and an observation is made at the same time with existing models, the outcome at an aggregate level may appear random or noisy with no apparent pattern. Existing models, such as time-series forecast models, fail to account for the noise altogether or inadequately deal with the noise based on aggregating the seemingly random behavior into a value that indicates a probable outcome based on a majority observation of other data points. These seemingly random phenomena are typically tagged as outliers and do not carry predictive weight.

As described above, this noise-like randomness is often made up of several latent factors that account for specific patterns of observations over time. As the number of factors that affect the prediction are very independent for given domains, the accuracy of the models are typically not improved beyond a certain point because the cumulative effect of several factors reduce the accuracy.

Various embodiments of the present disclosure improve these existing technologies by reducing the effect of apparent randomness or noise in forecast accuracy predictions. Although true randomness may not be modeled, particular embodiments identify one or more random compensating factors (e.g., latent factors that appear to be random but are not), determine one or more patterns over time associated with the one or more random compensating factors (e.g., via additive and subtractive harmonic synthesis), and/or generate a prediction using the one or more random compensating factors to improve accuracy.

Although some machine learning models can learn (e.g., via neural node connection weighting during training) which features are more important for a given prediction, these technologies still use the same factors as input. One assumption is that the specific universe of factors that have been identified are sufficient to make accurate predictions for every domain. However, latent factors may never be identified and therefore used for the machine learning training or learning, even though they may be crucial for making predictions for certain domains. Moreover, even if specific factors have been learned to be associated with a particular prediction, various rounds of training may cause overfitting of the model. When a model gets trained with a lot of data it often starts learning from inaccurate data entries in a data set. This causes inaccuracies based on the inaccurate data entries.

Various embodiments of the present disclosure improve existing machine learning models because they do not use the same factors as input for every domain (e.g., particular logistics facilities) and do not train on inaccurate data. This effectively reduces or removes randomness for particular domains and thus effectively eliminates or reduces overfitting. For instance, in predicting the amount of volume that will be processed, a first sorting center may use a base model (e.g., exponential smoothing model) and then a first randomness compensating factor (e.g., weather). A second sorting second may also use the base model but then use a second randomness compensating factor (e.g., a geopolitical event) instead of the first randomness compensating factor. There may be particular patterns of observations regarding weather for the first sorting center (but not the second sorting center). Likewise there may be particular patterns of observations regarding the geopolitical event for the second sorting center (but not the first sorting center). Accordingly, in each case randomness can be reduced for both sorting centers and the same factors are not used for both sorting centers.

Various embodiments of the present disclosure additionally improve conventional techniques used in the shipping industry for making logistics-based forecasts. For instance, conventional techniques for predicting in the shipping industry include using generic spreadsheet or graphical trend computer applications to predict sort volume (e.g., the amount of parcels that will get processed) in a sorting center, predict building operational capacity (e.g., predicting staff capacity), predict the length of time a delivery will take, and the like. However, using the techniques described above, such as using one or more random compensating factors, embodiments can make these predictions more accurate, which can greatly impact how efficient logistics functions operate.

It is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more logistics vehicles 120, one or more analysis computing entities 105, one or more computing entities 110 (e.g., a mobile device, such as a DIAD), one or more satellites 112, one or more networks 135, a data corpus 160 and/or the like. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT or IoE network, which is a network of interconnected items that are each provided with unique identifiers (e.g., UIDs) and computing logic so as to communicate or transfer data with each other or other components. Such communication can happen without requiring human-to-human or human-to-computer interaction. For example, a IoT network may include the logistics vehicle 120, which is equipped with one or more sensors and transmitter in order to process and/or transmit sensor data over the network 135 to the analysis computing entity(s) 105. In the context of an IoT network, a computer (not shown) within the logistics vehicle 120 can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the analysis computing entity(s) 105) for analysis.

In some embodiments, the local processing device(s) is a mesh or other network of microdata centers or edge nodes that process and store local data received from sensors coupled to the logistics vehicle 120 and push or transmit some or all of the data to a cloud device or a corporate data center that is or is included in the one or more analysis computing entities 105. In some embodiments, the local processing device(s) store all of the data and only transmit selected (e.g., data that meets a threshold) or important data to the one or more analysis computing entities 105. Accordingly, the non-important data or the data that is in a group that does not meet a threshold is not transmitted. For example, a lidar, radar, and/or camera sensor located within the logistics vehicle 120 may sample map data but only push a portion of the map data. Accordingly, only after the condition or threshold has been met, do the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of a device to perform an action (e.g., turn based on the control signal received). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

The data corpus 160 represents a data store (e.g. a database) or set of data stores (e.g., a distributed set of storage devices) that stores data concerning specific domains. In this way, randomness compensating factors can be determined and used for making a time-based prediction. For example, the data corpus 160 can store information concerning local and national holidays associated with a sorting center, weather associated with the sorting center, geo-political events in an area where the sorting center is located, the businesses in the locale in the sorting center, and the like. In this way, the analysis computing entity 105 can determine one or more randomness compensating factors and determine one or more observational patterns over time in connection with the randomness compensating factors. For example, the data corpus 160 can store information indicating that a first logistics store is in an area where there is a local holiday every particular day every year. In particular embodiments, the analysis computing entity 105 can obtain this information (e.g., via the network 135) and determine that this is a randomness compensating factor, make a time-based prediction forecast, identify one or more patterns associated with the randomness compensating factor, modify the forecast with the randomness compensating factor, and then responsively send a notification to the computing entity 110 and/or send a control signal to an apparatus (e.g., the logistics vehicle 120, a conveyor belt (not shown)), which is described in more detail below. In some embodiments, the one or more analysis computing entities 105 obtain the data for determining randomness compensating factors from the logistics vehicle 120 in addition or alternative to the data corpus 160.

1. Exemplary Analysis Computing Entities

FIG. 2 provides a schematic of an analysis computing entity 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the analysis computing entity 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in particular embodiments, the analysis computing entity 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 105 components may be located remotely from other analysis computing entity 105 components, such as in a distributed system. Additionally or alternatively, the analysis computing entity 105 may be represented among a plurality of analysis computing entities. For example, the analysis computing entity 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for registering one or more users, processing one or more shipping requests, securing parcels, monitoring shipments, and/or for operation by a user (e.g., a vehicle operator, delivery personnel, customer, and/or the like). In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, smart glasses, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the analysis computing entity 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330. In this way, the computing entity 110 is a special-purpose computer or particular machine. In some embodiments, at least one of the computing entities 110 is coupled to the logistics vehicle 120 (e.g., within the trunk). The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects in a geographical environment.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the analysis computing entity 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the analysis computing entity 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the analysis computing entity 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers, and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the analysis computing entity 105 and/or various other computing entities.

In another embodiment, the computing entity 110 may include one or more components or functionality that are the same or similar to those of the analysis computing entity 105, as described in greater detail above. As will be recognized, these architectures and descriptions are provided for exemplary purposes only and are not limiting to the various embodiments.

3. Exemplary Logistics Vehicle

FIG. 4 is a block diagram of the logistics vehicle 120 of FIG. 1, according to some embodiments. Although the logistics vehicle 120 is represented as a specific vehicle with specific sensors, it is understood that any suitable vehicle and/or sensor may exist. For example, in some embodiments, the logistics vehicle 120 is represented as a drone or unmanned aerial vehicle (UAV) that travels in air space to unload parcels, an aircraft, a car, a boat, etc. A "logistics vehicle" as described herein is any transportation vehicle that is configured to perform one or more shipping operations. For example, a logistics vehicle can be an air-traversing drone, a tractor trailer, a van, delivery shuttle, shifter, line-hauler, and/or an airplane that carries one or more parcels. A "shipping operation" is any activity (either completed or initially engaged in) related to the shipment of one or more parcels. For example, a shipping operation can include the beginning or completion of a delivery and/or pick up one or more parcels (e.g., packages, envelopes, bags, pallets, etc.) to and/or from a destination or pickup point (e.g., a delivery home or business address, shipping locker, geocoordinates (e.g., a specific part of a property) of an area by an address, etc.), also known as final mile delivery.

In these embodiments, the traversal of logistics vehicles through a geographical environment typically occurs via one or more delivery routes such that the logistics vehicle traverses multiple different destination or pickup points along the delivery routes. In these embodiments, traversal of logistics vehicles along a route is typically proceeded by a request from a shipper to ship one or more items. For example, a shipper can arrive at a logistics store where the shipper pays for the shipping of a parcel, after which the parcel is loaded onto the logistics vehicle to a sorting center or its destination. Any one of these steps can be a "shipping operation". In another example, a user may be presented with a user interface of a web page or app page that is connected to a logistics network or other third party (e.g., an e-commerce merchant) and where the user can electronically issue a request to ship one or more items. Subsequently, the item can be loaded into the logistics vehicle. Any one of these steps can be a "shipping operation". A shipping operation can alternatively or additionally include delivering packages from a logistics store, locker, or address in a tractor trailer (or other vehicle) to a shipping facility, such as a sorting center. A sorting center is a facility where parcels are culled, labeled, and otherwise organized in preparation for final mile delivery. In some embodiments, a shipping operation can also include pre-activity or post-activity of final mile delivery or other shipping operations. For example, a shipping operation can include the time after which one or more logistics vehicles finish a delivery route or delivering parcels and are one their way back to a facility (e.g., a sorting facility).

In various embodiments, the logistics vehicle 120 includes the lidar units 404-1, 404-2, 404-3, the radar units 406-1 406-2, 406-3, the telematics device 420, the camera(s) 402, and the computing device 430 (e.g., a computing entity 110), such as an edge node. The lidar (Light Detection and Ranging) units 404 are sensors that detect objects and build a map of a geographical environment based on transmitting a plurality of light pulses a second and measure how long it takes for those light pulses to bounce off of objects in the environment back to the sensor (e.g., 150,000 pulses per second). These lidar units, such as 404-1, can indefinitely spin transversely in a plane parallel to the ground capturing a 360-degree image of the logistics vehicle 120's surroundings. The output is a three-dimensional mapping of the geographical environment. These sensors can also calculate the distance between itself and the objects within the environment, as well as detecting exact sizes, colors, shapes of objects, and/or other metadata.

The radar units 406 are similar to the lidar units 404 in that they also transmit signals and measure how long these signals take to bounce off objects back to the sensor. However, these signals are radio waves, instead of light pulses (which are faster). These sensors detect road dynamics, such as detours, traffic delays, vehicle collisions, and other objects. Long range radar typically detects objects further away compared to lidar, which can be used for adaptive cruise control and the like. Whereas lidar typically detects objects that are less far away and is used for emergency braking, pedestrian detection, collision avoidance, etc.

The one or more cameras 402 utilize object recognition or computer vision algorithms to detect and classify objects on the road, such as lane lines and traffic signs. These cameras can provide images to the computing device 430 for determining depth of field, peripheral movement, and dimensionality of objects. In some embodiments, these cameras 402 use deep learning or other machine learning models and techniques for object classification. For example, in some embodiments, convolutional neural networks (CNN) are used to detect and classify objects, such as determining and classifying objects (e.g., car, person, traffic light, etc.). The one or more cameras 402 can be used for short-distance recognition, such park assistance, compared to other sensors, such as lidar.

The telematics device 420 is configured to control a variety of vehicle sensors, collect vehicle telematics data generated by sensors, and transmit the telematics data to the one or more analysis computing entities 105 and/or the computing entities 110 via one of several communication methods. In various embodiments, the logistics vehicle 120 is equipped with one or more vehicle sensors (e.g., the vehicle's engine speed sensor, speed sensor, seat belt status sensor, direction sensor, and location sensor). These sensors can detect one or more of the following attributes: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle doors (e.g., open or closed), vehicle handles (e.g., grasped or not grasped by a driver), vehicle location (e.g., latitude and longitude), distance traveled (e.g., miles between two points), use of portable data acquisition device (e.g., in use or not in use), throttle position, brake pedal position, parking brake position, and other measurements (e.g., engine oil pressure, engine temperature, or engine faults). These sensors described above may be configured, for example, to operate in any fashion suitable to generate computer-readable data that may be captured and transmitted by the telematics device 420.

In some embodiments, the telematics device 420 includes one or more of the following components, which are not shown: a processor, a location-determining device or sensor (e.g., GPS sensor), a real-time clock, J-Bus protocol architecture, an electronic control module (ECM), a port for receiving and decoding data from the vehicle sensors in one of the logistics vehicles 120, a communication port for receiving instruction data, a radio frequency identification (RFID) tag, a power source, a data radio for communication with a WWAN, a WLAN and/or a WPAN, FLASH, DRAM, and NVRAM memory modules, and a programmable logic controller (PLC). In an alternative embodiment, the RFID tag, the location sensor, and the PLC may be located in the logistic vehicle 120 external to the telematics device 420. In various embodiments, the telematics device may omit certain of the components described above. It should be understood that the telematics device may include any other suitable components. For example, the telematics device may include other types of communications components than those described above.

According to one embodiment, a processor is configured to capture and store telematics data from one or more vehicle sensors (e.g., GPS sensor, lidar unit 404, radar unit 406-1, etc.) on a logistics vehicle 120 upon the occurrence of one or more defined vehicle events. The processor is configured such that any parameter measurable by the one or more vehicle sensors may be defined as a vehicle event. The processor is also configured to associate telematics data received from the vehicle sensors 410 with contextual data indicating, for example: (1) the time the data was captured (e.g., through time-stamping), (2) the vehicle the data was captured from, (3) the driver of the vehicle, (4) a log reason for capturing the data, and/or (5) the route the driver was on at the time the data was collected. In various embodiments, the processor is further configured to transmit the telematics data to the computing entity 110 and/or the one or more analysis computing entities 105. In other embodiments, the processes described herein as being carried out by a single processor may be accomplished by multiple processors.

In one embodiment, the location sensor, which may be one of several components available in the telematics device 420, may be compatible with a low Earth orbit (LEO) satellite system or a Department of Defense (DOD) satellite system (e.g., via the satellite 112). Alternatively, triangulation may be used in connection with various cellular towers positioned at various locations throughout a geographic area in order to determine the location of the logistics vehicle 120 and/or its driver. The location sensor 202 may be used to receive position, time, and speed data. It will be appreciated by those skilled in the art that more than one location sensor 202 may be utilized, and that other similar techniques may likewise be used to collect geo-location information associated with the logistics vehicle 120 and/or its driver.

In some embodiments, the ECM with J-Bus protocol may be one of several components available in the telematics device 420. The ECM, which may be a scalable and subservient device to the telematics device 420, may have data processor capability to decode and store analog and digital inputs and ECM data streams from vehicle systems and the sensors. The ECM may further have data processing capability to collect and present vehicle data to the J-Bus (which may allow transmittal to the telematics device 420), and output standard vehicle diagnostic codes when received from a vehicle's J-Bus-compatible on-board controllers or vehicle sensors.

In some embodiments, an instruction data receiving port may be one of several components available in the telematics device 420. Embodiments of the instruction data receiving port may include an Infrared Data Association (IrDA) communication port, a data radio, and/or a serial port. The instruction receiving data port may receive instructions for the telematics device 420. These instructions may be specific to the logistics vehicle 120 in which the telematics device 420 is installed, specific to the geographical area in which the logistics vehicle 120 will be traveling, or specific to the function the logistics vehicle 120 serves within the fleet.

In some embodiments, a radio frequency identification (RFID) tag may be one of several components available for use with the telematics device 420. One embodiment of the RFID tag may include an active RFID tag, which comprises at least one of the following: (1) an internal clock; (2) a memory; (3) a microprocessor; and (4) at least one input interface for connecting with sensors located in the logistics vehicle 120 or the telematics device 420. Another embodiment of the RFID tag may be a passive RFID tag. One or more RFID tags may be internal to the telematics device 420, wired to the telematics device 420, and/or proximate to the telematics device 420. Each RFID tag may communicate wirelessly with RFID interrogators within a certain geographical range of each other. RFID interrogators may be located external to the logistics vehicle 120 and/or within the computing entity 110 that can be carried in and out of the logistics vehicle 120 by the vehicle operator.

In some embodiments, vehicle performance and tracking data collected by the telematics device 420 (e.g., telematics data) may be transmitted via a WPAN to, and stored by, the computing entity 110 until a communication link can be established between the computing entity 110 and the analysis computing entity 105, or similar network entity or mainframe computer system. In one embodiment, the computing entity 110 may display telematics data for the driver's viewing, which may be helpful in troubleshooting vehicle performance problems and showing delivery route progress and instructions. In an alternative embodiment, the computing entity 110 may be a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

In some embodiments, the telematics device 420 receives the sensor data from the mapping sensors, such as the lidar units 404, radar sensors 406, and camera 402 in order to provide more accurate predictions for vehicle events or more accuracy for mapping. For example, in some embodiments, the telematics data described above is combined with this mapping data from the sensors to provide additional insights, such as average speed of the logistics vehicle 120. These rich insights can be used for more than typical telematics sensors. For example, with rich mapping data determined from the camera(s) 402 and the lidar units 404, it can be determined exactly when and where drivers took left turns or other maneuvers that either conform to or violate company protocols. These extra insights allow for significantly more monitoring of drivers, vehicles, and the way they react to the environment they are in. All of the information obtained from the telematics device 420 can be output for display on a user interface of the computing entity 110.

In various embodiments, some or all of the data derived from the sensors/devices described with respect to FIG. 4 is used as input into a time-based prediction model or otherwise used to determine randomness compensating factors and associated patterns for making predictions described herein. For example, each of the data collected from the telematics device 420 and/or the lidar units 404, radar sensors 406, and/or the camera 406 are used to make a time-series prediction of whether the driver of the vehicle 120 is conforming to specified work protocols (e.g., whether he is always taking right turns instead of left turns, whether he has his seatbelt on, whether he is taking the best routes, whether he deviates from the scope of his work, etc.). Alternatively or additionally, the vehicle 120 described with respect to FIG. 4 is used as an output of making a time-based prediction using one or more randomness compensating factors. For example, in response to making a prediction of a certain pickup or sorting volume at a facility, embodiments (e.g., the one or more analysis computing entities 105) can send a control signal to the logistics vehicle 120, which causes the logistics vehicle 120 to drive (via the lidar units 404, radar sensor 406, and the camera 406) to the specific facility in preparation to receive the volume of parcels predicted at the facility.

In some embodiments, the logistics vehicle 120 is a fully or partially autonomous vehicle for object detection. A "partially autonomous vehicle" or "semi-autonomous vehicle" as described herein is a vehicle where at least one function is human or operator-controlled in a manual manner and at least one function is autonomous in that it is controlled by the autonomous vehicle without human control or intervention. For example, a partially autonomous vehicle can be a vehicle where the cruise control or regular braking is manually performed by a human but autonomous functions can include emergency braking or sending notifications about potential hazards that are out of sight of the human eyes in the same vehicle. An "autonomous vehicle"

or fully autonomous vehicle is a vehicle where no human control or interaction is required, such as braking, turning, cruise control, etc.

FIG. 5 is a block diagram of a system 500 for making a time-based prediction, according to particular embodiments. The system 500 is generally responsible for making one or more time-based predictions and providing a final output (e.g., a user interface). In some embodiments, the randomness compensating model 505, the presentation layer 516, the output time-based prediction 514, and/or the control signal propagator 518 is included in the one or more analysis computing entities 105 of FIG. 1. In other embodiments, some or each of the components in the system 200 are distributed or dispersed among some or each of the components of FIG. 1 (e.g., the mobile computing entity 110, the logistics vehicle 120, and the analysis computing entity 105). In some embodiments, the input data 502 is any data received from the data corpus 160, the logistics vehicle 120 (e.g., via the telematics device or other sensors), and/or the one or more mobile computing entities 110.

The input data 512 represents any suitable data that is fed or provided to the randomness compensating model 504 such that the randomness compensating model 504 can make time-based predictions based on the input data 512 it receives. In some embodiments, the input data 512 includes historical induction volume from different logistics facilities at different time periods (e.g., observed volume at particular time slices). Historical induction volume for instance can include the quantity of parcels (e.g., packages, crates, containers, bags of items, envelopes, etc.) processed through a logistics store or sorting facility on a given day/week/month/year. In the shipping industry, before a parcel reaches a final delivery destination, it typically goes through various operations. For instance, after a package has been dropped off at a carrier store for a delivery request (or ordered from an online merchant), it may be routed to a sorting facility where the package traverses various different conveyor belt assemblies and processes in the sorting facility based on information associated with the package (e.g., size of package, destination address, weight, etc.). After traversal of the package through the sorting center, the package may be loaded into a logistics vehicle for delivery to the final delivery destination or delivery to the next sorting phase operation. In various instances, it may be desirable to predict the volume or quantity of parcels that will be processed at the logistics store or sorting facility in order to prepare resources (e.g., conveyor belt assemblies or carrier personnel numbers).

In some embodiments, the input data 502 additionally or alternatively includes one or more of: parcel received time (e.g., the actual time one or more parcels are received at a sorting operation facility), manifest parcel time, parcel information such as tracking number, parcel activity time stamp, parcel dimension including height, length and/or width, parcel weight, parcel manifested weight (e.g., the weight of a parcel as indicated in a parcel manifest), parcel manifest time stamp (e.g., the time at which a parcel manifest is uploaded), parcel service type, parcel scanned time stamp (e.g., the time at which a parcel was scanned to capture parcel information data), parcel tracking number, parcel sort type code, parcel scanned code (e.g., a barcode), unit load device type code, account number associated with the parcel, and the like. A "unit load device type code" identifies an entity type in which one or more parcels are loaded into for delivery, such as a container, a delivery vehicle, a bag, a pallet, etc.

The term "parcel manifest" refers to a report (e.g., a digital document) provided by a shipper to a shipping service provider that summarizes the shipment information about one or more parcels that the shipper is going to provide to the shipping service provider. A parcel manifest may include one or more of: the shipper's account information, shipping record identifier, dimensions of the parcel to be picked up, a planned parcel pick up time, a parcel pick up location, parcel weight, tracking number, manifest time stamp (e.g., day of week, month, week, and/or hour that manifest is uploaded), service type code, the like. A parcel manifest may include any of the information described in the present disclosure.

The term "manifest parcel time" refers to the planned parcel pick up time (e.g., by a carrier) and/or planned drop off time (e.g., by a shipper to a carrier) as indicated in the parcel manifest. For example, a shipper may request that a shipping service provider send a driver to pick up a package at a certain location (manifest package location) at a manifest package time by selecting or inputting the time in a manifest package time field of the package manifest.

The term "parcel received time" refers to the actual time where the package is received by a shipping service provider or carrier from a shipper. For example, the package received time may be when carrier personnel at a shipping store print out a label for a package that a shipper has brought to the shipping store.

The term "parcel activity time stamp" refers to a time stamp generated based on the time-stamp data acquired when performing one or more parcel activities. Parcel activity time stamps are indicative of times (e.g., clock-times) at which one or more parcels are received and/or transmitted to/from one or more locations. For example, a package time activity time stamp may be one or more of the following: a time stamp generated when the package is received from the shipper, a time stamp generated when the package is sent from a receiving site (e.g., a sorting facility) to an intermediate transmit vehicle (e.g., an airplane), a time stamp generated when the package is sent from an intermediate transmit vehicle to another vehicle (e.g., the vehicle 107), and the like.

The term "service type" or "parcel service type" refers to the categorization of the service provided associated with the parcel. For example, service type may be categorized by delivery speed, return receipt requested, insurance associated with the package, originating location, destination location, and the like. Exemplary service types include "Next Day Air", "2nd day Air", "Worldwide Express", "Standard", and the like. In some embodiments, the service type is input or selected within the package manifest by a shipper.

The term "sort type" or "parcel sort type code" refers to the categorization of time in hours/minutes of package received time. An exemplary way of defining sort type is provided as the following:

Package received between 10:00 pm and 5:00 am: Sort type "Late night";

Package received between 5:00 am and 8:00 am: Sort type "Early Morning";

Package received between 8:00 am and 2:00 pm: Sort type "Morning to early afternoon";

Package received between 2:00 pm and 10:00 pm: Sort type "Afternoon to Night".

In some embodiments, the input data 502 additionally or alternatively includes sensor data obtained by the logistics vehicle 120. For example, the input data 502 can include sensor readings collected by the telematics device 420 or any other sensor on the logistics vehicle 120. In some embodiments the input data 502 additionally or alternatively includes data from the data corpus 160 of FIG. 1. Additionally or alternatively, the input data 502 includes data input at the one or more computing entities 110.

The randomness compensating model 504 is generally responsible for generating the output time-based prediction 514 based at least in part on the input data 502 via the base time series forecasting model 510, the randomness compensating factor engine 506, and the residual random factor generator 512.

The base time-series forecast model 510 is generally responsible for making time-based predictions. In various embodiments, this model is or includes any suitable model, such as an Autoregressive Integrated Moving Average (ARIMA) model, a Trigonometric Exponential smoothing State Space Model (TBATS), Prophet, XGBoost gradient learning, AutoML, Naiive, a Hidden Markov Model, and/or the like. These models have some level of accuracy in making time-based predictions but not enough accuracy since they do not account for patterns in noise or apparent randomness. Accordingly, various embodiments augment or add data derived from the randomness compensating factor engine 506 to the output prediction of the base time-series model, as described in more detail below.

The randomness compensating factor engine 506 is generally responsible for modifying a prediction made by the base time series forecasting model 510 and/or making a new prediction relative to the time series forecasting model 510. The randomness compensating factor engine 506 does so by determining or extracting the randomness compensating factor 1-$n$ (i.e., one or more) 508, determining one or more patterns associated with the randomness compensating factor(s) 508 via the randomness compensating factor pattern generator 509, and responsively using the prediction modifier 530 to modify the prediction made by the base time series forecasting model 510.

The one or more random compensating factors 508 or any "randomness compensating factor" described herein refers to any feature(s), attribute(s), or other phenomena for which there can be an observation made at certain associated time slices (e.g., days, weeks) in order to make one or more predictions at a future time slice(s) and in order to reduce randomness. Randomness compensating factors are typically data point (e.g., sorting center) specific in that some (or different) randomness compensating factors are used for some data points but not others. For example, a randomness compensating factor can be a location of a logistics facility, particular identity or amount of businesses within a threshold distance of the logistics facility, seasonality of the logistics facility local and national holiday in an area of the logistics facility, sale events at or near the logistics facility, business recalls at or near the logistics facility, weather in the same city as the logistics facility, customer behavior (e.g., via parcel manifest) leading up to or at the logistics facility, geo-political events (e.g., voting event for local elections), operational failures need volume to be handled by neighboring centers, and the like. A particular observation (e.g., parcel volume) can be made at the particular time slices (also referred to herein as "time intervals" or "time periods") (e.g., days, weeks, months, and/or years) that these factors occur on in order to make future predictions. For example, using the illustration above, a "sale event" at a logistics store A may occur every Monday. In some embodiments, the one or more randomness compensating factors are stored in the input data 502.

The randomness compensating factor engine 506 may extract or determine the one or more randomness compensating factors 508 using any suitable user selection or automated functionality. For example, in some embodiments the one or more randomness compensating factors 508 are determined in response to receiving user input (e.g., a UI selection or string formulation) that specifies the randomness compensating factor(s) 508. For instance, embodiments can receive a UI user selection of a button "randomness compensating factor," where the user specifies the type: "geopolitical event-local election," and specifies the time slice(s) that it will occur on as "Friday, March $22^{nd}$." Alternatively or additionally, in some embodiments the one or more randomness compensating factors 508 (or their values) are extracted or determined via one or more automated algorithms without user input. For example, in response to a data point being specified, such as a first center, embodiments can automatically extract values for a predetermined set of randomness compensating factor types. For example, using the illustrations above, embodiments can extract: a logistics facility location, a particular identity or amount of businesses within a threshold distance of the logistics facility, a seasonality of the logistics facility local and national holiday in an area of the logistics facility, sale events at or near the logistics facility, business recalls at or near the logistics facility, weather in the same city as the logistics facility, customer behavior (e.g., via parcel manifest) leading up to or at the logistics facility, geo-political events (e.g., voting event for local elections), operational failures need volume to be handled by neighboring centers, and the like.

The randomness compensating factor pattern determiner 509 is generally responsible for associating the one or more randomness compensating factors 508 with one or more time-based patterns with regard to a historical observation for a particular time slice or set of time slices. The randomness compensating factor pattern determiner 509 additionally or alternatively determines the one or more time-based patterns with regard to the historical observations. For example, some embodiments perform harmonics synthesis or otherwise identify harmonics-type patterns in particular observations over some time period. A waveform is a periodic mathematic function(s) defined by a frequency, amplitude, and phase. Frequency is the number of full cycles or that the waveform goes through in one second (or time period). In various instances, a harmonic is a waveform with a frequency that is a perfect integer multiple of the frequency of any given waveform. When certain observations are made, harmonics can be generated between time slices for each observation made, which is indicative of a pattern of observations. For example, embodiments can determine that there has historically been a volume between 100 and 1015 on a particular holiday each year. However, for every other day of the week that the holiday is on, there is a volume between 2000 and 3000. Accordingly, there is subtractive or negative pattern of waves (i.e., observations) that can be visualized for every holiday via harmonics synthesis, which can appear to be noise by other time series forecasting models, which would use the majority data from the non-holidays.

In some embodiments, the randomness compensating factor pattern determiner 509 adds the harmonics of a fundamental sinusoidal waveform to each other and to the fundamental waveform itself. This is known as "additive synthesis." Each harmonic may have a different amplitude (level) and phase. By varying these properties and adding them together, the randomness compensating factor pattern determiner 509 can generate any type of waveform. Conversely, the randomness compensating factor pattern generator 509 removes the harmonics of fundamental sinusoidal waveform to each other, which is known as "subtractive synthesis." By varying these properties and subtracting them one from another, can also modify or generate any type of waveform.

In some embodiments, the randomness compensating factor pattern determiner 509 alternatively or additionally determines patterns based on using one or more machine learning algorithms. For example, some embodiments use a deep learning neural network (e.g., a Convolutional Neural Network (CNN), Recurrent Neural Network (RNN), random forest regression, or the like to learn patterns and associations for the observations for particular time periods. Accordingly, machine learning algorithms may parse or extract features of historical data (e.g., features from the input data 502), learn (e.g., via training) about the historical data by making observations or identifying patterns in data, in order to make a determination, prediction, and/or classification of the subsequent input based on the learning without relying on rules-based programming (e.g., conditional statement rules).

In an illustrative example of how harmonics synthesis works or how the randomness compensating factor pattern determiner 509 functions, embodiments can identify every week (or other time period) of the year to a known week pattern from a set of 11 to 13 typical weeks of the year, for example. From historical data, it is understood how certain customers are affected/influenced in those weeks. Weather incidents can correspond to a set of data points. Local events and regional events and their influence on the volume can be another set of data points. Customer's self-declared forecast to logistics entities can be yet another set of data points. Using all this data, we determine the underlying frequencies that resulted in the harmonics. For example, particular embodiments can apply pattern recognition (e.g., via one or more machine learning models) and/or clustering analysis (e.g., via a clustering model, such as k-means, connectivity models, graph-based models, etc.) to identify 11-13 sets of unique weekly ratios by day of week. For instance, Easter, January 1st week, Normal week, Monday holiday week, July 4th, Thanksgiving, Cyber week, Peak week 2, Peak week 3, Christmas and New Year Eve, Prime day, singles day.

The prediction modifier 530 is generally responsible for modifying the prediction made by the base time series forecasting model 510 (or making a new prediction) based on the randomness compensating factor(s) 508 that have been identified and the pattern(s) extracted via the randomness compensating factor pattern determiner 509. In some embodiments, the prediction modifier 530 modifies the prediction by adding or subtracting prediction values via weighting or the like. In some embodiments, "weighting" includes adding or subtracting prediction values directly proportional to the difference between the predicted values made by the base time series forecasting model 510 (or observed values for non-randomness compensating factors) and past observed values for the randomness compensating factor(s) 508. For example, if the base time series forecasting model 510 predicted that there would be 43 sales on this coming Tuesday based on averaging the last three observed Tuesday sales of 55, 52, and 22 but the randomness compensating factor pattern determiner 509 determined that a randomness compensating factor (e.g., a region-wide geopolitical event) occurred on the same date as the date of the 22 sales and would not occur for the upcoming predicted Tuesday date, then the prediction modifier 530 can weight 43 to a higher value (e.g., 50) based on the proportion or percentage difference between 43 and 22. This is because, for example, the geopolitical event or other randomness compensating factor may only occur during certain time periods but will not occur in other future time periods, thus potentially affecting observed values. For instance, if most people in a town attended a geopolitical event on a Tuesday, they would not have time to ship parcels, and so the volume would be lower. Because the geopolitical event may be annual or otherwise not occur often, this data point should not be used for predictions or should otherwise be modified.

Alternatively or additionally, in some embodiments, the prediction modifier 530 modifies the base time series forecasting model 510 prediction itself by completely removing (or adding) observations that are a part of a randomness compensating factor. For example, using the illustration above, instead of weighting, embodiments can completely remove the observed Tuesday sale of 22 such that the average or other aggregation calculation does not take into account the value of 22. For instance, embodiments can average 55 and 52 to arrive at a predicted value of 52.5 (instead of 43).

The residual randomness determiner 512 determines residual randomness between the prediction made by the prediction modifier 530 and the actual observed values. "Residual randomness" as described herein refers to the difference between observed values (e.g., historical volume count for a Monday) and a predicted value (e.g., predicted volume count for a future Monday). The "predicted value" in some embodiments represents the prediction made by the prediction modifier 530, as described above. Additionally or alternatively, residual randomness corresponds to phenomena, features, or the like for which the randomness compensating factor pattern determiner 509 is not able to determine a pattern for.

In some embodiments, the residual random factor determiner 512 determines residual randomness by performing regression and analysis to create a confidence level for the aggregate forecast (i.e., the output time-based prediction 514). In these embodiments, the residual randomness equates to the vertical distance (or distance in observation) between a data point (i.e., an actual observation) and a corresponding portion of a regression line representing the predicted value for the same time slice. For example, for time slice A (Saturday), it may be predicted that 30 personnel will arrive at a particular location, but the actual personnel arrival may have been 20. The residual is thus 10—the difference between 30 and 20. In this way, the residual randomness determiner 512 can generate a confidence interval or otherwise provide a probability that a parameter or prediction value will fall between two set values for a certain proportion of times. For instance, there can be a 95% probability that the predicted value will be between 30 and 20.

The output time-based prediction 514 represents the prediction made by the prediction modifier 530, along with the confidence interval generated by the residual randomness determiner 512. In some embodiments, the output time-based prediction 514 is illustrated by the following formula:

$$F(t) = F_b(t) + \sum_{i=0}^{i=n} f_i(t) + R(t)$$

where F(t) represents a forecast for a particular domain for the time frame t (final forecast), and where Fb(t) represents a base time series forecasting model prediction for the particular domain (as generated by the base time series forecasting model 510), and where $f_i(t)$ represents a randomness compensating factor (one of the randomness compensating factor(s) 508) for a domain that is not part of the base forecast up to n factors for the particular domain, and where R(t) represents residual randomness (as determined by the residual randomness determiner 512) that is not modeled for the particular domain using a randomness compensating factor.

In some embodiments, the output time-based prediction 514 is provided (e.g., via an API) to a presentation layer 516. The presentation layer 516 is generally responsible for structuring, tagging, or otherwise formatting the output time-based prediction 514 for presentation (e.g., to a service or user device). For example, the presentation layer 516 can cause display of a user interface of a user device that includes the prediction made by the prediction modifier 530 and the confidence level generated by the residual randomness determiner 512.

In some embodiments, the randomness compensating module 504 communicates, via an application programming interface (API), to the presentation layer 516 and/or the control signal propagator 518. In some embodiments, the presentation layer 516 includes one or more applications or services on a user device (e.g., the mobile computing entity 110), across multiple user devices, or in the cloud. For example, in one embodiment, presentation layer 516 manages the presentation of content to a user across multiple user devices associated with that user. Based on content logic, device features, and/or other user data, presentation layer 516 may determine on which user device(s) content is presented, as well as the context of the presentation, such as how (or in what format and how much content, which can be dependent on the user device or context) it is presented, when it is presented. In particular, in some embodiments, presentation layer 516 applies content logic to device features, or sensed user data to determine aspects of content presentation.

In some embodiments, presentation layer 516 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation layer 516 can present the one or more randomness compensating factors 508, one or more patterns determined by the randomness compensating factor pattern determiner 509, the predictions made by the prediction modifier 530 (and/or the base time series forecasting model 510), and/or the confidence level. In some embodiments, the presentation layer 516 presents warnings, notifications, or other alerts based on the predictions made by the prediction modifier 530. For example, the presentation layer 516 can cause a notification to be displayed to the mobile computing entity 110, which alerts carrier personnel that they need to travel to a logistics facility, inform others, or otherwise prepare for a predicted volume at a particular time period based on the predictions made.

Alternative or in addition to the presentation layer 516 functionality, in some embodiments the randomness compensating module 504 (or module) communicates, via an API, to the control signal propagator 518 (e.g., when the output time-based prediction 514 has surpassed a particular threshold). This communication causes the control signal propagator 518 to send a control signal to a machine, apparatus, or article of manufacture, which effectively and tangibly causes such machine, apparatus, or article of manufacture to activate or otherwise perform a particular function. For example, if it is predicted that carrier personnel will not conform to driving protocols (e.g., via the input data 502 that includes telematics device 420 data, such as sensor data indicating whether driver is wearing a seatbelt) during a certain time period, the control signal propagator 518 can send a control signal to the logistics vehicle 120 to completely stop or deactivate the logistics vehicle 120 such that the driver cannot drive the logistics vehicle 120. In another example, if it is predicted that the volume will surpass a threshold at a sorting center, then the control signal propagator 518 can send a control signal to the logistics vehicle 120 so that the logistics vehicle 120, being autonomous in some embodiments, can traverse to a docking station at the sorting center in preparation to receive the predicted volume for final-mile delivery. As described above, in some embodiments, the logistics vehicle 120 includes a drone or AAV and so the control signal can be sent to these apparatuses. Additionally or alternatively, the control signal propagator 518 can send a control signal to a conveyor belt apparatus within the sorting center thereby causing the conveyor belt to speed up or slow down in response to receiving the predicted volume at the sorting center.

In yet other examples, the control signal propagator 508 can send a control signal to a computing device (e.g., the mobile computing entity 110) causing an auditory (e.g., a beeping sound), visual (e.g., flashing LEDs), buzzing/vibrating, and/or other alert type based on the output time-based prediction 514 being over some threshold. For example, in response to the volume predicted to be over a threshold, the control signal propagator 518 can cause a control signal to be sent to a conveyor apparatus, DIAD, a component within the logistics vehicle 120, or other item, which emits an auditory sound to alert an operator or user that attention is needed based on the output time-based prediction 514.

IV. Exemplary System Operation

FIG. 6 is a schematic diagram 600 illustrating how a composite observation can be broken down into a base model, randomness compensating factor patterns, and residual randomness, according to some embodiments. In some embodiments, the diagram 600 can be provided or presented to a computing device (e.g., via the presentation layer 516 of FIG. 5). The diagram 600 generally represents different historical observations (e.g., specific parcel volume quantities processed) at specific values (Y-axis) over a time period (X-axis).

The row 602 illustrates a composite observation with seemingly random phenomena. The "composite" observations corresponds to raw observations over a time period without the data having gone through any time-based models, normalizing, filtering, and the like. As illustrated, the data appears very noisy and appear not to have any patterns in some portions.

The row 604 illustrates a time-based model (e.g., the base time series forecasting model 510) that represents the observed behavior but it does not have factors to compensate randomness. As illustrated, only the general or generic trends have been captured from the raw data in the composite observation, such as via average or other metric.

Accordingly, this leaves out extreme outliers, such as the observation 602-2 relative to the observation 602-1 for the same time slice.

Row 606 illustrates an indication of a first randomness compensating factor identified (e.g., randomness compensating factor 508), along with an apparent pattern (e.g., as determined by the randomness compensating factor pattern determiner 509) of observations over time—i.e., the data points 602-2, 602-3, 602-4, and 602-5. As is illustrated, these data point observations over this time period are at or near the same value after nearly the same amount of time that goes by, which is nearly completely opposite of the data points in the composite observations (e.g., data pint 602-1). As illustrated, these are "subtractive" (e.g., subtractive harmonics synthesis) or have negative patterns/trends based at least in part on the observations being lower than the base model for the same time slices.

Rows 608, 610, and 612 all illustrates indications of other randomness compensating factors, along with associated patterns of observations over time—the same time slices as the model and other randomness compensating factors. As illustrated, these are "Additive" (e.g., additive harmonics synthesis) or have positive patterns/trends based at least in part on the observations being higher than the base model for the same time slices.

Row 614 illustrates residual randomness (e.g., as determined by the residual randomness determiner 512), which represents true randomness. Although residual randomness is not modeled, the effect is significantly reduced, as described above with respect to FIG. 5. As illustrated, there is no apparent pattern of observations for the same time slices as the base models or randomness compensating factors.

FIG. 7 is a time-series graph 700 that specifically illustrates a base model volume observation relative to a volume observation associated with a particular randomness compensating factor for the same time slices, according to some embodiments. In some embodiments, FIG. 7 represents a portion of the diagram of FIG. 6. For instance, data point 703 may represent or be included in the data point 602-2 and data point 705 may represent or be included in data point 602-1. A "data point" in this context represents a particular observation made at a particular time slice. A data point may additionally refer to a predicted value (not just observed value) for a particular time slice.

As illustrated in the time-series graph 700 for data point 705, the base model observes that there were 8000 parcels processed at a logistics facility for time slice T1 (e.g., clock time, day, week, month, year, etc.) and for data point 709, around the same number processed (e.g., 7090) at time slice T2. Further, for data point 703, embodiments (e.g., the randomness compensating factor pattern determiner 509) observes that there were only 1000 parcels processed at the logistics facility for the same slice T1 (e.g., the same clock time on a different day, the same day of a different week, the same week for a different year, etc.). For data point 707, around the same number processed (e.g., 1050) at time slice T2. As described above, certain embodiments (e.g., the prediction modifier 530) can take the difference between the observations 8000 and 1000 at T1 (or all of the observations for each time slice T1 and T2) and weight or aggregate the prediction accordingly. For example, some embodiments average the observations 8000 and 1000 to arrive at a new predicted value of 4,500. Some embodiments weight the 8000 observational value only slightly lower (as defined by a particular percentage, such as 1% or 2%) based on the difference being over a threshold or the probability that the local event randomness compensating factor occurring at some future time interval. For example, 8000 can be multiplied by 0.02 (2%), in which the raw number 160 is subtracted from 8000 to arrive at a number of 7,840 if it is predicted that at time slice T3 (a future time where no observations can be made), the local event will not occur. Conversely, 8000 can be multiplied by 0.6, in which the raw number 4,800 to arrive at a number 3,200 if it is predicted that at time slice T3, the local event will occur. In some embodiments, this prediction of whether the local event will or will not occur at T3 is based on the patterns identified (e.g., by the randomness compensating factor pattern determiner 509). For example, the time-series graph 700 may indicate a pattern between T1 and T2 in that there have been observed values of around 1000. Accordingly, it can be predicted that for the same future time slice T3 (e.g., the same day on a different week), that the volume will be closer to 100. Accordingly, some embodiments responsively weight the base model projection closer to the predicted value for T3 for the randomness compensating factor associated with the local event (e.g., a local sale, local holiday, local political event, etc.). The reverse is true if T3 was not a same time slice as T1 and T2 (e.g., it was a different day of the week), such that the weighting would stay closer to the base-model prediction or no weighting would be used at all.

FIG. 8A is a schematic diagram of an example exponential smoothing forecast model table 800, according to some embodiments. In some embodiments, the forecast in FIG. 8A represents a prediction made by the base time series forecasting model 510 of FIG. 5. Although the table 800 includes specific values, calculations (e.g., WMAP), and time sequences (day 1-5), it is understood that this is representatively only and that any set of values, calculations, and/or time sequences can exist. For example, instead of or in addition to making volume forecasts for a particular set of "days," there may be forecasts for a particular sequence of months, years, weeks, and/or any other time period sequence. In another example, instead of or in addition to calculating WMAPE (weighted mean absolute percent error), other model accuracy validation methods can be used, such as root mean square error (RMSE), mean absolute percent error (MAPE), mean square error (MSE), and/or any other suitable error calculation mechanism. In various embodiments, the table 800 (or similar table with the same calculations) is included in or used with one or more learning models. In some embodiments, the table 800 represents a data structure stored in memory, such as a hash table. In some embodiments, the table 800 is configured to be stored in memory and be displayed (e.g., to the mobile computing entity 110) in response to or while generating output of a volume forecast The table 800 illustrates what the volume forecast or prediction will be for days 1 through 5 for the logistics facility Y. The logistics facility Y can represent any suitable logistics facility, such as a sorting center, logistics store, logistics vehicle, etc. These forecasts can be provided for multiple logistics facilities. It is understood that although FIGS. 8A (and 8B, 8C, 8D, and 8D) represent "volume" observed values associated with logistics facility domains and forecasts, any suitable observation and domain can be represented. For example, the domain can be a particular retailer store or other facility where the observation is the amount of sales that are used to forecast a certain number of sales. In another example, the domain can be a certain company or entity where an observation is the stock price that is used to forecast a future stock price.

The particular values are populated within the table 800 based on exponential smoothing forecast algorithms. In various embodiments, generating a forecast or prediction for a particular day is generated through the following expression: $F_t+1=\alpha A_t(1-\alpha)F_t$, where $F_t+1$ is a particular forecast/prediction of volume for a particular time period (day) or forecast/prediction for the current time period, where a (alpha) is a value between 0 and 1 (i.e., the smoothing constant), where $A_t$ is the last actual volume value (e.g., actual quantity of received parcels) of the immediately preceding time period, and where $F_t$ is the last forecast value (e.g., predicted quantity of parcels that a facility will receive) of the immediately preceding time period. For purposes of the specific values within the table 900, alpha $\alpha$ is assumed to be 0.2.

In an example illustration, at day three it may be currently unknown how many "small" parcels will be received at sorting facility Y. However, the learning model may project that there will be 34.2 small parcels that will be received at sorting facility Y on day 3, as illustrated in the table 800. Accordingly, using the expression above, the new forecast or forecast at day three $(F_t+1)=(0.2)(43)+(0.8)(32)$, which equals 34.2. That is, alpha 0.2 is multiplied by the last actual value $A_t$ of day 2, which is 43. The result is a value of 8.6. Then 0.8 (the value of $1-\alpha$) is multiplied by 32, which is the last forecasted value $F_t$ of day 2 to arrive at a value of 25.6. Then 8.6 is added to 25.6 to arrive at the final result of 34.2. Accordingly, even though the current actual volume value $A_t$ of 56 may not be known at the time, it can be projected that there will be 34.2 small parcels received at sorting facility Y on day 3. Then at a later time, the actual value for day 3 may be received, which is 56, may be used to make future forecasts (day 4 and day 5). Day 5 illustrates a time period where the actual volume $A_t$ is currently unknown, but the forecasted value $F_t$ is still projected to be 41.65 based on using the expression above.

The "Error," "Error²," and "WMAP" columns of the table 900 are utilized to validate accuracy of the exponential smoothing forecast model. The values of the "Error" column are calculated by subtracting the forecasted values from the actual values for each time period $(A_t-F_t)$. For example, for day 2, $A_t$ value of 43 is used to subtract the $F_t$ day 2 value of 32 to arrive at an "Error" value of 11. The "Error²" values are calculated by squaring each of the corresponding Error values for the same time period. For example, for day 2, the error value of 11 is squared to arrive at a value of 121. The "Error²" column can be used to generate other analyses, such as MSE, which is calculated by adding up each squared error of the table 800 and dividing this value by the total number of time periods (5 days). The "WMAPE" (weighted mean absolute percent error) is calculated via the following expression:

$$\frac{\sum \frac{|A-F|}{A} \times 100 \times A}{\sum A}$$

where A represents $A_t$ or the current volume value for a particular day and F represents $F_t$ or the currently forecasted volume value for the same particular day. For example, for day 2, the absolute value of 43 (the actual volume value)−32 (the forecasted volume value) is divided by 43 to arrive at 0.256. This value is then multiplied by 100 and 43 to arrive at the value of 1, 100.0, which is then divided by 43 to arrive at the WMAPE value of 25.6 for day 2. WMAPE is utilized to focus on or weight errors that have a relatively larger impact or little to no impact at all. Standard MAPE calculations treat all errors equally, while WMAPE calculations place greater significance on errors associated with larger items by weighting these errors more.

FIG. 8B is a schematic diagram of an example time series graph 803 associated with the table 800 of FIG. 8A. The graph 803 represents actual and forecasted volume predictions for different alpha values and actual values. In some embodiments, the "time" axis (X-axis) is or includes days 1-5 as indicated in the table 800. For example, the "time" axis in the graph 803 can represent a larger time sequence, such as days 1-90, where days 1-5 (as indicated in FIG. 8A) is only a portion of the overall time sequence. The "volume" axis (Y-axis) represents the raw number or quantity (and projected quantities) of shipments or parcels received or shipped. The time series instance 805 represents the actual volume quantity received over a first time at a particular trend or slope. The time series instance 807 represents the projected volume quantity that will be received over the same first time at a first alpha level (e.g., 0.7) at a particular trend. The time series instance 809 represents the projected volume quantity that will be received over the same first time at a second alpha level (e.g., 0.2) at a particular trend. As illustrated in the graph 903, both the actual received volume and the volume projections become considerably larger as the time progresses. In some embodiments, the graph 803 is configured to be stored in memory and be displayed (e.g., to the mobile computing entity 110) in response to generating output of a volume forecast.

FIG. 8C is a schematic diagram of an example exponential smoothing forecast model table 800-1 with adjusted values relative to FIG. 8A, according to some embodiments. FIG. 8C represents adjusted forecast values in light of using the randomness compensating factor A. In some embodiments, the "adjusted forecast" is performed by the prediction modifier 530 of FIG. 5. The table 800-1 illustrates that randomness compensating factor A occurs on both days 3 and 4 (e.g., a two-day sale that occurs these same two days every month). Accordingly, for day 3, the forecast value of 34.2 illustrated in the table 800 has been modified to 52. Likewise, for day 4, the forecast value of 38.56 has been modified to 50. As illustrated in the table 800-1, the "error," "error 2," and "WMAPE" values are responsively modified based on the adjusted forecast relative to the table 800. Specifically, these error values and the residual randomness in general of table 800-1 is lowered relative to the corresponding values in the table 800. As described herein, this is because the randomness compensating factor A has been determined. Accordingly, forecasted values can be weighted or otherwise changed, as described herein.

FIG. 8D is a schematic diagram of an example time series graph 811 associated with the table 800-1 of FIG. 8C. The graph 811 represents actual and adjusted forecasted volume predictions for different alpha values and actual values similar to FIG. 8B. The time series instance 813 represents the actual volume quantity received over a first time at a particular trend or slope. The time series instance 815 represents the modified projected volume quantity that will be received over the same first time at a first alpha level (e.g., 0.7) at a particular trend. As illustrated, the instance 815 more closely follows time series instance 813 relative to time instance 807 to 805 based on the reduced error statistics and reduced randomness. The time series instance 817 represents the projected volume quantity that will be received over the same first time at a second alpha level (e.g., 0.2) at a particular trend.

FIG. 9 is a schematic diagram of a mobile device 900 indicating an alert that is presented based on making a prediction, according to embodiments. In some embodiments, the mobile device 900 represents the mobile computing entity 110 or any other user device. In some embodiments, the alert represents the notification that is pushed by the presentation layer 516 to a mobile computing entity 110. Alternatively or additionally, this represents an alert that is surfaced in response to the projections made as illustrated in FIG. 6, FIG. 7, and/or FIGS. 9C and 9D. The alert states "WARNING . . . you may have staff shortages at facility Y for Saturday March 14$^{th}$ based on the predicted volume. Click button for more details."

In response to receiving the user selection of the button 903, particular embodiments generate and provide a more detailed or expanded view of particular information associated with the alert. For example, any element illustrated in FIG. 6, FIG. 7, FIG. 9C, and/or FIG. 9D can be presented for display on the mobile device 900 such that the user can see exactly what the projected volume is for certain dates, the residual randomness, and other dates, etc. In response to receiving the user selection of the button 905, embodiments send a notification to other user devices associated with personnel at facility Y. For example, embodiments can send the alert (e.g., via email, SMS text, chat, etc.) to the manager at facility Y so that the manager can call or otherwise communicate with workers to have them work additional/longer shifts based on the alert.

In some embodiments, the alert on computing device 900 is provided by a logistics entity, such as by the analysis computing entity 105 (e.g., over the network(s) 135 to the computing entity 110). In particular embodiments, the alert is provided to any suitable entity, such as one or more of the computing entities 110, and/or the logistics vehicle 120. The alert can be accessed or provided in any suitable manner. For example, in some embodiments, a user can open a client application, such as a web browser, and input a particular Uniform Resource Locator (URL) corresponding to a particular website or portal. In response to receiving the user's URL request, an entity, such as the one or more analysis computing entities 105 may provide or cause to be displayed to a user device (e.g., a computing entity 110), the alert.

FIG. 10 is a flow diagram of an example process 1000 for generating a prediction, according to some embodiments. The process 1000 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process does not include blocks 1009 and/or block 1013. Such added blocks may include blocks that embody any functionality described herein. For example, there may be an added block that describes the functionality of the control signal propagator 518. The computer-implemented method, the system (that includes at least one computing device having at least one processor and at least one computer readable storage medium), and/or the computer readable storage medium as described herein may perform or be caused to perform the process 800, and/or any other functionality described herein.

The process 1000 is directed using statistical techniques and pattern determination methods (e.g., harmonics synthe-sis) to reduce the effect of randomness in forecast accuracy. In most cases, true randomness cannot be modeled. When modeling a time series event, seemingly appearing randomness may be broken down to basic patterns (e.g., as illustrated for data points 703 and 707 of FIG. 7 or rows 606, 608, 610, 612, 614 of FIG. 6). Various randomness compensating factors that have different patterns relative to each other or a base model can be addressed independently (e.g., as shown in FIG. 6). The residual randomness may be factored to improve the accuracy of an aggregate forecast (e.g., a forecast of several base time-series models). Certain embodiments describe a process/platform that improves forecast accuracy by determining an addition call a "randomness compensating factor," which may influence traditional time series forecast models. Existing technology and applications do not forecast or predict events that appear to have a high degree of randomness with randomness compensating factors to increase the forecast accuracy.

Per block 1003, some embodiments receive input data that includes one or more observations made at corresponding time slice(s). For example, embodiments can receive sensor data from the logistics vehicle 120 (or more specifically from the telematics device 420 or other computing device located on the logistics vehicle 120) where observations are made that the logistics vehicle was at certain geo-coordinates (e.g., latitude and longitude) at specific time slices (e.g., 4 p.m. and 6 p.m.). Other examples of block 1003 are described with respect to FIG. 7 where it is observed that certain parcel volume observations were made at time slices T1 and T2. Other example of bloc 1003 are described with respect to FIG. 8A where it is observed that there are certain "volume" observations made for each of the days 1 through 5.

It is understood that these observations and time slices described with respect to block 1003 are representative only. As such, the input data may be any suitable data where any conceivable observation can be made for any event for any time period. For example, the input data can be or include any of the input data described with respect to the input data 502. Additionally or alternatively, the input data can be any data gathered by any sensor or device located on the logistics vehicle 120. Additionally or alternatively, the input data can include the following: historical pickup volume by service level for various time slices, historical pickup volume by logistics facility for various time slices, IoT data on parcels with RFID or other sensors that indicate parcel manifest or other parcel attributes for various time slices, commercial seasonality data, autonomous and smart vehicle data for various time slices or sensor data captured from a logistics vehicle (e.g., the lidar, radar, and/or camera data received from the logistics vehicle 120), telematics data (e.g., gathered from the telematics device 420 of FIG. 4) captured from a logistics vehicle for various time slices, staff capacity or staff count numbers for particular time slices for a particular logistics facility, staff absence counts for particular time slices, data captured from a parcel manifest (or any data associated with a parcel), and/or the like.

Per block 1005, particular embodiments provide the input data to a time-based prediction model. A "time-based prediction model" as described herein is any suitable model that makes predictions based at least in part on time or temporal factors. For example, the time-based prediction model can be any suitable machine learning model (e.g., Long Short Term Memory (LSTM) networks, Recurrent Neural Networks (RNN), Multi-layer Perception (MLP)), time series forecasting model, or any other model, such as Naive models, exponential smoothing models, ARIMA/SARIMA, and the like. In some embodiments, the one or more time-based prediction models represent the one or more base time-series forecasting models 510 of FIG. 5. In various embodiments, the time-based prediction models predict one or more future values (e.g., the "forecast" value of 32 in FIG. 8A) for one or more future time slices (e.g., day 1) based on the one or more time-based prediction models analyzing the input data. For example, this is described with respect to the time-series forecasting model(s) 510 of FIG. 5. An example of this is also described with respect to FIG. 8A where various forecasts are made for particular days.

Per block 1007, one or more randomness compensating factors are determined. In some embodiments, block 1007 is performed by the randomness compensating factor engine 506 as described herein. In some embodiments, the one or more randomness compensating factors correspond to one or more features indicative of one or more events that occur on one or more of the corresponding time slices. For example, the one or more events can be any suitable event or factor described with respect to the one or more randomness compensating factors 508, the "local event randomness compensating factor" of FIG. 7, the randomness compensating factor "A" of FIG. 8D. Examples of such events include: a national holiday on a certain day of the year, a local holiday on a particular day each month, a bi-weekly sale event, weather data (e.g., specific temperature or specific forecast of snow, rain, sun, pressure) at a particular time period, a business recall event on a particular day, a location of a sorting center, a geo-political event (e.g., a local voting event) on a particular day over multiple years, the type of business near a domain, and the like.

In some embodiments, the one or more features corresponding to the events are not indicated in the one or more base time-series forecasting models (or time-based prediction models). For example, as indicated in the row 604, the primary model does not include or observe the subtractive randomness compensating factors 602-2, 602-3, 602-4, 602-5. As indicated herein, some existing models determine that this historical observed phenomena corresponds to noise or randomness and so it is not taken into account in particular models. Alternatively, in some embodiments, these one or more features are used in the one or more time-based prediction models but are viewed as outliers or anomalies such that they are given little to no weight for predictions, as described herein with respect to the base time series forecasting model(s) 510.

In some embodiments, the one or more randomness compensating factors include at least one factor from a group of factors consisting of: a location of a logistics facility (e.g., a sorting center), a quantity or type of business (e.g., retailer, service or gas station, restaurant, etc.) within a threshold distance (e.g., 1 mile) of the logistics facility, a local or national holiday associated with the logistics facility, a sale event associated with the logistics facility (e.g., a large-scale liquidation sale in the same city as the logistics facility), a business recall associated with the logistics facility, weather associated with the logistics facility (e.g., weather in a city where logistics facility is located), customer behavior associated with the logistics facility (e.g., parcel manifest information for parcels received at the logistics facility), a geopolitical event associated with the logistics facility, and one or more operational failures associated with the logistics facility. An example of an "operational failure" may be broken down or inactive conveyor belt assemblies, staff shortages at logistics facilities, one or more machines (e.g., scanners or devices) at logistics facilities that are inactive or not working, logistics vehicles that are not working, and/or the like.

Per block 1009, particular embodiments determine a pattern of one or more observations associated with the one or more randomness compensating factors. For instance, particular embodiments determine, one or more of the corresponding time slices, one or more patterns of observations associated with the one or more randomness compensating factors. For example, referring back to FIG. 7, particular embodiments determine that for the local event randomness compensating factor occurring on time slice T1 and time slice T2 there is a subtractive observation pattern of nearly a 1000 volume count of parcels. In another example, referring back to FIG. 6, row 606 (and rows 608, 610, 612, and 614), particular embodiments determine a pattern of observations for time slices and associated randomness compensating factors 602-2, 602-3, 602-4, 602-5. In some embodiments, block 1009 is performed by the randomness compensating factor pattern generator 509 as described herein.

In some embodiments, the determining of the one or more patterns of block 1009 includes using harmonics synthesis, such as using additive synthesis or negative synthesis. This is described, for example, with respect to FIG. 6 where the randomness compensating factors are described as "subtractive" or "additive." This is also described herein with respect to the randomness compensating factor generator 509, which describes harmonics synthesis. As described herein, various embodiments brake down seemingly random-looking phenomena (e.g., noisy observations made at particular time slices) into basic harmonics-style patterns to reduce aggregate randomness. Instead of having one monolithic model or a formula for forecasting, various embodiments use an aggregate method to improve the accuracy. Embodiments can break down the aggregate random influence into several randomness compensating factors and patterns. Some factors could be additive while some could be subtractive. In some instances, multiplicative seasonality is addressed by the time-based predictive model. However, in some embodiments, the randomness compensating factor(s) may be multiplicative also.

Per block 1011, based at least in part on the randomness compensating factors and/or the patterns of observation(s), particular embodiments generate a prediction or forecast. For instance, some embodiments modify the prediction of the one or more time-based prediction models based at least in part on the one or more randomness compensating factors and the one or more patterns. For example, this is described with respect to the prediction modifier 530 of FIG. 5, where the base-time series forecasting model(s) 510 first generates a prediction or forecast, but that prediction can later be weighted, aggregated, or otherwise changed by the prediction modifier 530 based on the functionality of the randomness compensating factor engine 514. In some embodiments, block 1011 is described with respect to the functionality of the output time-based prediction 514 of FIG. 5 and/or the prediction modifier 530 of FIG. 5.

Alternatively or additionally, block 1011 can include using the prediction of the one or more time-based prediction models to generate another prediction. Such "another prediction" can include an aggregate prediction that uses the prediction value of the time-based prediction model(s) that does not necessarily "modify" the time-based prediction model(s) but takes this prediction into account for generating an overall prediction. For example, embodiments can take the prediction value of the one or more time-based prediction models and generate a new value based on weighting or otherwise changing the time-based prediction model value(s). This is described with respect to the prediction modifier 530 of FIG. 5. In this way, particular embodiments can predict a set of values (e.g., a second one or more values) for at least one of the one or more future time slices based at least in part on the determining of the one or more randomness compensating factors and/or the prediction of the one or more time-based prediction models.

In some embodiments, the modifying of the prediction of the one or more base time-series forecasting models (or time-based prediction models) includes changing a volume prediction (e.g., predicting a quantity of parcels that will arrive at a particular logistics facility) for a particular logistics facility from a first value to a second value for a particular time slice. This is illustrated, for example, with respect to FIGS. 8A and 8C where the original value on day 3 was forecasted to be 34.2 by the base model (FIG. 8A), but embodiments changed the day 3 prediction to be 52, as illustrated in FIG. 8C.

Some embodiments start with a standard time series forecasting model at every logistics facility (or other domain) but also adds one or more randomness compensating factors, along with a random factor (residual randomness), to represent residual randomness. The factors or features that affect different logistics facilities (or domains generally) may be very different. For example, the center that services a large online retailer may have very different factors compared to a rural center that is services a low seasonality of business. Known severe weather locations may have a different factor compared to centers that serve government agencies which may be affected by geo-political activities. A "domain" as described herein is a knowledge representation, category, topic, or other data set that predictions or forecasts are made for (disregarding predictions for other domains). For example, a first domain can be a first logistics facility and a second domain may be a second logistics facility. In another example, a first domain can be a first retailer and a second domain can be a second retailer. In yet another example, a first domain can be a first city and a second domain can be a second city. For each domain there may be specific randomness compensating factors (e.g., weather, sales events, etc.) that affect only the specific domains In these instances where different features can affect different domains, the one or more randomness compensating factors and the modified prediction are determined for a first domain (e.g., a first logistics facility). Additionally, embodiments determine, for a second domain (e.g., a second logistics facility), a second set of randomness compensating factors different than the one or more randomness compensating factors. One or more other patterns of observations associated with the second set of randomness compensating factors can be determined. Based on the second set of randomness compensating factors and the one or more other patterns, embodiments change the prediction of the one or more time-based prediction models to a value different than a value made based on the modification of the prediction. For example, referring back to FIGS. 8A and 8C, in addition to embodiments calculating the forecasts for logistics facility Y, embodiments can additionally calculate separate forecasts for another logistics facility Z (e.g., similar to FIG. 8A) using different randomness compensating factors B (which are different than the randomness compensating factor A used in FIG. 8C) such that other patterns are captured and predictions are made similar to what is illustrated by the table 800-1 of FIG. 8C.

In addition to block 1011, some embodiments additionally determine residual randomness based at least in part on the modified prediction and the plurality of observations. For example, this is described with respect to the residual randomness determiner 512 of FIG. 5. Some embodiments alternatively or additionally generate a confidence interval based at least in part on a difference between the another generated prediction and the plurality of observations. For example, this is described with respect to the residual randomness determiner 512 of FIG. 5.

Some embodiments generate the prediction at block 1011 as represented in the following formula:

$$F(t) = F_b(t) + \sum_{i=0}^{i=n} f_i(t) + R(t)$$

where F(t) represents a forecast for a particular domain for the time frame t, and where $F_b(t)$ represents a base time series forecasting model prediction for the particular domain, and where $f_i(t)$ represents a randomness compensating factor for a domain that is not part of the base forecast up to n factors for the particular domain, and where R(t) represents residual randomness that is not modeled for the particular domain using a randomness compensating factor. For every building, customer data, seasonality data, operation exceptions, customer provided forecast data, operational data, and/or other data, this formula can use randomness compensating factors for each domain (e.g., and each sort type). The identified randomness compensating factors influence and augment the output of the standard base model time-series output. In some embodiments, once these factors are determined, regression analysis is done to determine residual randomness and a confidence level is created for the aggregate forecast. Collectively, the base model output with addition of randomness compensating factors and residual randomness provide a high degree of accuracy to the forecast relative to existing technologies.

Per block 1013, particular embodiments present, to a computing device, an indication associated with the prediction. An "indication" as described herein refers to actual content or payload of the prediction itself (e.g., some or all of the data indicated in FIG. 8C) or information associated with the content or payload, such as a warning (e.g., the "WARNING" indicated of FIG. 9) or other information related to the prediction or forecast. In an illustrative example of block 1013, in response to the generating/modifying of the prediction (or generating of the another prediction) of block 1011, embodiments present, to a user computer device, an indication associated with the modified prediction, as described with respect to the presentation layer 516. In some embodiments, the presentation layer 516 performs block 1013.

Alternatively or in addition to block 1013, some embodiments cause a control signal to be transmitted to a machine, apparatus, or article of manufacture for further functionality. Examples of this are described with respect to the control signal propagator 518 of FIG. 5. For example, some embodiments communicate, via an API, with the control signal propagator 518, which causes the control signal propagator 518 to send a control signal (or computer instruction) to: the logistics vehicle 120, conveyor belt apparatus, mobile computing entity 110, or other device to cause any functionality as described herein with respect to the control signal propagator 518.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the analysis computing entity 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

V. Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A system comprising:
at least one computing device having one or more processors; and
at least one computer readable storage medium having program instructions embodied therewith, the program instructions readable or executable by the one or more processors to cause the system to:
receive data derived from at least one of a telematics device, a mapping sensor, a lidar sensor, or a camera of at least one of an autonomous vehicle or a conveyor belt apparatus, wherein the data comprises a plurality of observations made by at least one of the telematics device, the mapping sensor, the lidar sensor, or the camera at corresponding time intervals, and the plurality of observations includes raw outlier data;
process the data via a base time-series forecasting model to generate a prediction of a condition affecting at least one of the autonomous vehicle or the conveyor belt apparatus for a future time interval;
extract values from the raw outlier data for a set of randomness compensating factors;
identify, by processing the values extracted from the raw outlier data via at least one machine learning model, a time-based pattern associated with a randomness compensating factor of the set of randomness compensating factors, wherein the at least one machine learning model is trained on a plurality of known time-based patterns derived from performing at least one of additive synthesis or subtractive synthesis on a set of historical raw outlier data derived from at least one of telematics devices, mapping sensors, lidar sensors, or cameras of at least one of autonomous vehicles or conveyor belt apparatuses to identify the plurality of known time-based patterns for the set of randomness compensating factors, the set of historical raw outlier data comprising a plurality of historical observations made by at least one of the telematics devices, the mapping sensors, the lidar sensors, or the cameras at corresponding past time intervals;
modify, based at least in part on the time-based pattern, the prediction to generate a modified prediction, wherein the modified prediction provides a predicted volume of parcels to process at a sorting center or the conveyor belt apparatus; and
cause, based at least in part on the modified prediction, a control signal to be sent to at least one of the autonomous vehicle to cause the autonomous vehicle to traverse to a docking station at the sorting center in preparation to receive the predicted volume of parcels for delivery or the conveyor belt apparatus to cause the conveyor belt apparatus to at least one of speed up or slow down.

2. The system of claim 1, wherein the one or more processors further cause the system to determine residual randomness based at least in part on the modified prediction and the plurality of observations by performing a regression to create a confidence interval for the modified prediction that provides a probability that the modified prediction falls between two set values.

3. The system of claim 1, wherein modifying the prediction to generate the modified prediction comprises performing at least one of adding or subtracting a prediction value to the prediction that is directly proportional to a difference between the prediction generated by the base time-series forecasting model and a past observed value for the randomness compensating factor.

4. The system of claim 1, wherein modifying the prediction to generate the modified prediction comprises at least one of removing observations that are a part of the randomness compensating factor from the plurality of observations to generate modified data and processing the modified data via the base time-series forecasting model to generate the modified prediction.

5. A method comprising:
performing at least one of additive synthesis or subtractive synthesis on a set of historical raw outlier data to identify a plurality of known patterns for a set of randomness compensating factors, wherein the set of historical raw outlier data comprises a plurality of historical observations made at corresponding past time intervals;
training at least one machine learning model using the plurality of known patterns;
receiving data that includes a plurality of observations made at corresponding time intervals, wherein the plurality of observations includes raw outlier data;
processing the data, by at least one computer processor and via a time-based prediction model, to generate a prediction of a condition affecting at least one of an autonomous vehicle or a conveyor belt apparatus for a future time interval;
extracting, by the at least one computer processor, values from the raw outlier data for the set of randomness compensating factors;
processing, by the at least one computer processor, the values extracted from the raw outlier data via the at least one machine learning model to identify a time-based pattern associated with a randomness compensating factor of the set of randomness compensating factors;
modifying, by the at least one computer processor and based at least in part on the time-based pattern, the prediction to generate a modified prediction;
determining, by the at least one computer processor that the modified prediction satisfies a threshold, wherein the modified prediction provides a predicted volume of parcels to process at a sorting center or the conveyor belt apparatus; and
responsive to determining the modified prediction satisfies the threshold, causing, by the at least one computer processor, a control signal to be sent to at least one of the autonomous vehicle to cause the autonomous vehicle to traverse to a docking station at the sorting center in preparation to receive the predicted volume of parcels for delivery or the conveyor belt apparatus to cause the conveyor belt apparatus to at least one of speed up or slow down.

6. The method of claim 5, further comprising generating, by the at least one computer processor, a confidence interval based least in part on a difference between the modified prediction and the plurality of observations, wherein the confidence interval provides a probability that the modified prediction falls between two set values.

7. The method of claim 5, wherein modifying the prediction to generate the modified prediction comprises performing at least one of adding or subtracting a prediction value to the prediction that is directly proportional to a difference between the prediction generated by the time-based prediction model and a past observed value for the randomness compensating factor.

8. The method of claim 5, wherein modifying the prediction to generate the modified prediction comprises at least one of removing observations that are a part of the randomness compensating factor from the plurality of observations to generate modified data and processing the modified data via the time-based prediction model to generate the modified prediction.

9. A computer readable storage medium apparatus having program instructions embodied therewith, the program instructions executable by one or more processors to cause the one or more processors to:
receive data derived from at least one of a telematics device, a mapping sensor, a lidar sensor, or a camera of at least one of an autonomous vehicle or a conveyor belt apparatus, wherein the data comprises a plurality of observations made by at least one of the telematics device, the mapping sensor, the lidar sensor, or the camera at corresponding time intervals, and the plurality of observations include raw outlier data;
process the data via a time-based prediction model to generate a predicted value associated with a condition affecting at least one of the autonomous vehicle or the conveyor belt apparatus for a future time interval;
extract values from the raw outlier data for a randomness compensating factor;
identify, by processing the values extracted from the raw outlier data via at least one machine learning model, a time-based pattern associated with the randomness compensating factor, wherein the at least one machine learning model is trained on a plurality of known time-based patterns derived from performing at least one of additive synthesis or subtractive synthesis on a set of historical raw outlier data derived from at least one of telematics devices, mapping sensors, lidar sensors, or cameras of at least one of autonomous vehicles or conveyor belt apparatuses to identify the plurality of known time-based patterns for at least the randomness compensating factor, the set of historical raw outlier data comprising a plurality of historical observations made by at least one of the telematics devices, the mapping sensors, the lidar sensors, or the cameras at corresponding past time intervals;

modify, based at least in part on the time-based pattern, the predicted value to generate a modified predicted value, wherein the modified predicted value provides a predicted volume of parcels to process at a sorting center or the conveyor belt apparatus; and cause, based at least in part on the modified predicted value, a control signal to be sent to at least one of the autonomous vehicle to cause the autonomous vehicle to traverse to a docking station at the sorting center in preparation to receive the predicted volume of parcels for delivery or the conveyor belt apparatus to cause the conveyor belt apparatus to at least one of speed up or slow down.

10. The computer readable storage medium apparatus of claim 9, wherein the one or more processors are further caused to determine residual randomness based at least in part on the modified predicted value and the plurality of observations.

11. The computer readable storage medium apparatus of claim 9, wherein modifying the predicted value to generate the modified predicted value comprises performing at least one of adding or subtracting a value to the predicted value that is directly proportional to a difference between the predicted value generated by the time-based prediction model and a past observed value for the randomness compensating factor.

12. The computer readable storage medium apparatus of claim 9, wherein modifying the predicted value to generate the modified predicted value comprises at least one of removing observations that are a part of the randomness compensating factor from the plurality of observations to generate modified data and processing the modified data via the time-based prediction model to generate the modified predicted value.

* * * * *